US011997354B2

United States Patent
Holton et al.

(10) Patent No.: US 11,997,354 B2
(45) Date of Patent: *May 28, 2024

(54) METHODS AND APPARATUS TO IDENTIFY AND TRIAGE DIGITAL AD RATINGS DATA QUALITY ISSUES

(71) Applicant: The Nielsen Company (US), LLC, New York, NY (US)

(72) Inventors: Aaron C. Holton, Lutz, FL (US); Rachel Anne Szabo, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,497

(22) Filed: Jan. 23, 2023

(65) Prior Publication Data

US 2023/0164393 A1     May 25, 2023

Related U.S. Application Data

(63) Continuation of application No. 17/463,058, filed on Aug. 31, 2021, now Pat. No. 11,564,012.

(Continued)

(51) Int. Cl.
*H04N 21/466*     (2011.01)
*H04N 21/258*     (2011.01)
*H04N 21/442*     (2011.01)

(52) U.S. Cl.
CPC ... *H04N 21/4667* (2013.01); *H04N 21/25808* (2013.01); *H04N 21/44222* (2013.01)

(58) Field of Classification Search
CPC ......... H04N 21/4667; H04N 21/25808; H04N 21/44222
See application file for complete search history.

(56) References Cited

U.S. PATENT DOCUMENTS

| | | | | |
|---|---|---|---|---|
| 6,108,637 A | * | 8/2000 | Blumenau | G06Q 30/0256 715/204 |
| 8,370,489 B2 | * | 2/2013 | Mazumdar | H04L 67/535 709/224 |

(Continued)

OTHER PUBLICATIONS

United States Patent and Trademark Office, "Non-Final Action" issued in connection with U.S. Appl. No. 17/463,058, dated Jun. 15, 2022, 8 pages.

(Continued)

*Primary Examiner* — Nathan J Flynn
*Assistant Examiner* — Christine A Kurien

(57) ABSTRACT

Methods, apparatus, systems and articles of manufacture to identify and triage digital ad ratings data quality issues includes processor circuitry to generate an aggregate factor score based on aggregate data from a first impression data point, the first impression data point including the aggregate data and duration data corresponding to a duration of time; determine a duration factor score based on the duration data from the first impression data point; determine a final weight score for the first impression data point using a normalized aggregate factor score and a normalized duration factor score for the first impression data point, the normalized aggregate factor score corresponding to aggregate factor scores of a second impression data point, the normalized duration factor score corresponding to duration factor scores of the second impression data point; and when the final weight score does not satisfy a threshold score.

20 Claims, 12 Drawing Sheets

Related U.S. Application Data

(60) Provisional application No. 63/227,131, filed on Jul. 29, 2021.

(56) References Cited

U.S. PATENT DOCUMENTS

| 11,564,012 B1 | 1/2023 | Holton et al. | |
| 2015/0262207 A1* | 9/2015 | Rao | H04W 4/18 |
| | | | 705/7.32 |

OTHER PUBLICATIONS

United States Patent and Trademark Office, "Notice of Allowance and Fee(s) Due" issued in connection with U.S. Appl. No. 17/463,058, dated Sep. 30, 2022, 7 pages.

* cited by examiner

| NIELSEN CAMPAIGN ID | NIELSEN SITE ID | NIELSEN PLACEMENT ID | DATA DATE | AGGREGATE CENSUS DATA COUNTS | AGGREGATE DP DEMOGRAPHIC COUNTS | DAILY CENSUS DATA COUNTS | DAILY DP DEMOGRAPHIC COUNTS |
|---|---|---|---|---|---|---|---|
| NLSN149032 | 2222491 | PLC50425252 | 2019-02-09 | 10000 | 10000 | 1000 | 900 |
| NLSN149032 | 2222491 | PLC50425452 | 2019-02-09 | 5000 | 2500 | 1000 | 800 |
| NLSN250394 | 3857552 | PLC11038503 | 2019-02-09 | 200 | 190 | 50 | 50 |
| NLSN250394 | 3857552 | PLC15803049 | 2019-02-09 | 10 | 10 | 5 | 2 |

FIG. 8A

| FINAL WEIGHT SCORE EQUATION TERM | CALCULATED SCORE | NORMALIZED SCORE |
|---|---|---|
| AGGREGATE DP/CENSUS DISCREPANCY | 2500 / 5000 = .5 | 0.5 |
| AGGREGATE DP AND CENSUS IMPRESSIONS >=1000 | 5000 > 1000, 2500 > 1000 = 5000 | 0.75 |
| PERCENT OF AGGREGATE PLACEMENT TO CAMPAIGN CENSUS IMPRESSIONS | 5000 / (5000 + 10000) = .33 | 0.33 |
| DAILY DP/CENSUS DISCREPANCY | 800 / 1000 = .8 | 0.8 |
| DAILY DP AND CENSUS IMPRESSIONS >=100 | 1000 > 100, 800 > 100 = 1000 | 0.8 |
| PERCENT OF DAILY PLACEMENT TO CAMPAIGN CENSUS IMPRESSIONS | 1000 / (1000+1000) = .5 | 0.5 |

$Ka = 0.8$

FINAL WEIGHT SCORE $= (.8 * .5 * .75 * .33) + (.8 * .8 * .5) = 0.419$

FIG. 8B

METHODS AND APPARATUS TO IDENTIFY AND TRIAGE DIGITAL AD RATINGS DATA QUALITY ISSUES

CROSS-REFERENCE TO RELATED APPLICATIONS

This patent arises from a continuation to U.S. patent application Ser. No. 17/463,058, now U.S. Pat. No. 11,564, 012, which was filed on Aug. 31, 2021, which claims priority to U.S. Provisional Patent Application No. 63/227,131, which was filed on Jul. 29, 2021. U.S. patent application Ser. No. 17/463,058 and U.S. Provisional Patent Application No. 63/227,131 re hereby incorporated herein by reference in their entireties. Priority to U.S. patent application Ser. No. 17/463,058 and U.S. Provisional Patent Application No. 63/227,131 is hereby claimed.

FIELD OF THE DISCLOSURE

This disclosure relates generally to digital ad ratings, and, more particularly, to methods and apparatus to identify and triage digital ad ratings data quality issues.

BACKGROUND

Traditionally, audience measurement entities determine audience exposure to media based on registered panel members. That is, an audience measurement entity (AME) enrolls people who consent to being monitored into a panel. The AME then monitors those panel members to determine media (e.g., television programs or radio programs, movies, DVDs, advertisements, webpages, streaming media, etc.) exposed to those panel members. In this manner, the audience measurement entity can determine exposure metrics for different media based on the collected media measurement data.

BRIEF DESCRIPTION OF THE DRAWINGS

FIG. 8A is a table illustrating example impression data points collected by the example systems of FIG. 1A and/or FIG. 1B to be analyzed by the data quality analyzation circuit of FIG. 2.

FIG. 8B is an example calculation done by the example data quality analyzation circuit of FIG. 2 using an example impression data point from FIG. 6A.

DETAILED DESCRIPTION

Figure 1A:
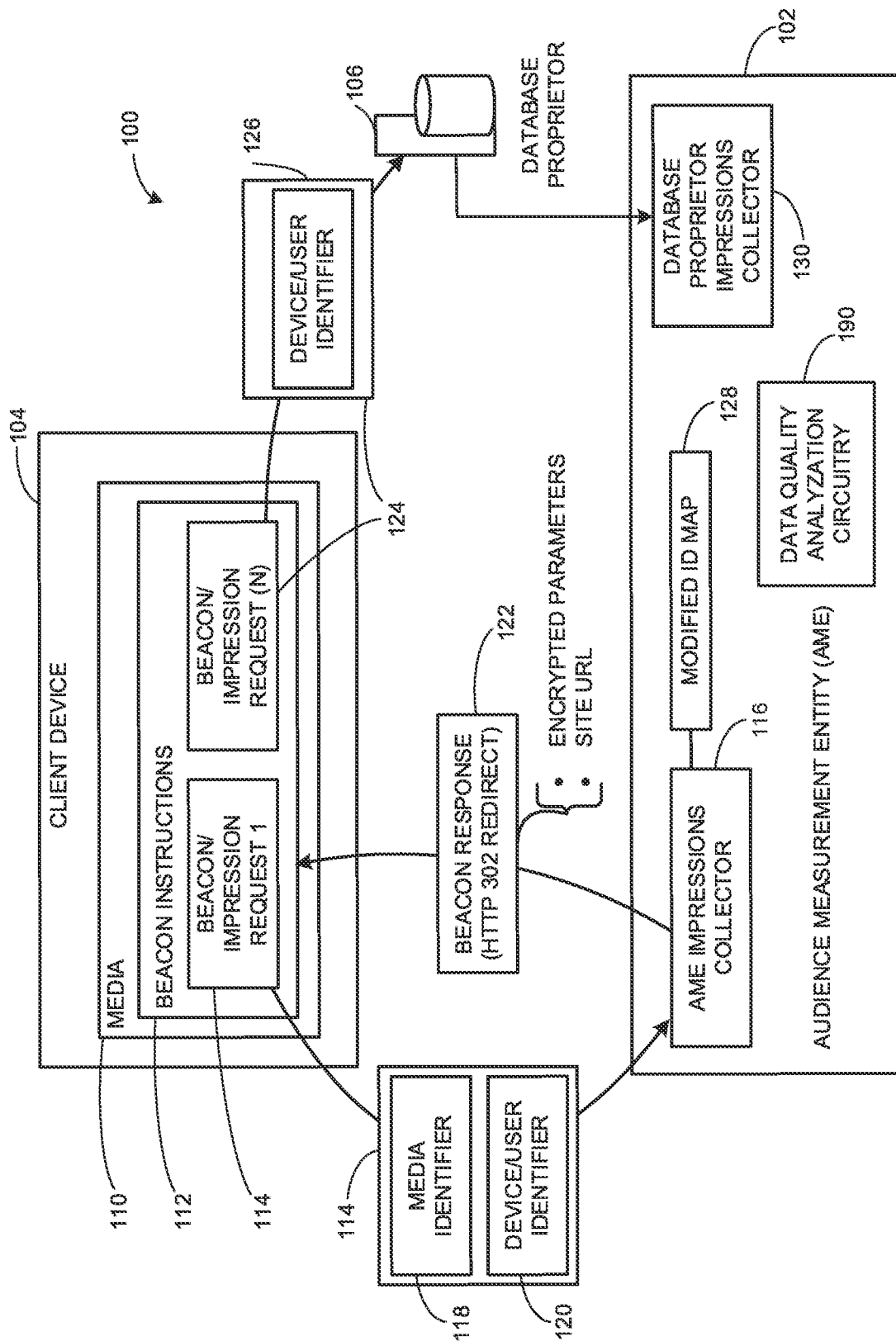
FIG. 1A illustrates an example communication environment in which an audience measurement entity (AME) can collect impressions and/or demographic information associated with audience members exposed to media.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

AMEs collect audience measurement information from panelists. The information may include a number of unique audience members for particular media and a number of impressions corresponding to each of the audience members. Unique audience size (e.g., reach), as used herein, refers to the total number of unique people (e.g., non-duplicated people) that were exposed to a particular media item. An impression count, as used herein, refers to the number of times that the audience members have been exposed to a particular media item. The unique audience size associated with a particular media item will always be equal to or less than the number of impressions associated with the media item because, while all audience members by definition have at least one impression of the media, one or more of the audience members may correspond to more than one impression. That is, the unique audience size is equal to the impression count only when every audience member was exposed to the media for a single time (i.e., the number of audience members equals the number of impressions). If at least one audience member is exposed to the media more than one time, the unique audience size will be less than the total impression count because multiple impressions will be associated with at least one individual audience member.

The number of times a particular audience member is exposed to a media item within a specified time period or duration is referred to as the impression frequency or simply, frequency. Thus, if each of six people is exposed to a particular advertisement once during a particular period and each of four other people is exposed to the same advertisement twice during the same period, the impression frequency for each of the first six people would be one while the impression frequency for each of the latter four people would be two. The impression count for the particular advertisement during a particular duration can be derived by multiplying each frequency value by the unique audience size corresponding to that frequency to generate a product for each frequency, and summing the products. Thus, in the above example, the impression frequency of one multiplied by the six unique audience members plus the impression frequency of two multiplied by the four unique audience members results in fourteen total impressions (e.g., 1×6+2×4=14) for the advertisement with the total unique audience size being ten (e.g., 6+4=10).

Techniques have been developed to enable AMEs to track impressions of Internet-based media (e.g., web pages, online advertisements, and/or other media). For example, the inventions disclosed in Blumenau, U.S. Pat. No. 6,102,637, which is hereby incorporated herein by reference in its entirety, involve a technique wherein Internet media to be tracked is tagged with beacon instructions. In particular, monitoring instructions are associated with the Hypertext Markup Language (HTML) of the media to be tracked. When a client requests the media, both the media and the beacon instructions are downloaded to the client. The beacon instructions are, thus, executed whenever the media is accessed, be it from a server or from a cache.

The beacon instructions cause monitoring data reflecting information about the access to the media (e.g., the occurrence of a media impression) to be sent from the client that downloaded the media to a monitoring entity. Typically, the monitoring entity is an AME (e.g., any entity interested in measuring or tracking audience exposures to advertisements, media, and/or any other media) that did not provide the media to the client and who is a trusted third party for providing accurate usage statistics (e.g., The Nielsen Company, LLC). Advantageously, because the beaconing instructions are associated with the media and executed by the client browser whenever the media is accessed, the monitoring information is provided to the AME irrespective of whether the client is associated with a panelist of the AME. In this manner, the AME is able to track every time a person is exposed to the media on a census-wide or population-wide level. As a result, the AME can reliably determine the total impression count for the media without having to extrapolate from panel data collected from a relatively limited pool of panelists within the population.

Tracking impressions by tagging media with beacon instructions in this manner is insufficient, by itself, to enable an AME to reliably determine the unique audience size associated with the media or the impression frequency associated with the audience members. The unique audience size and impression frequency cannot be determined because the collected monitoring information does not uniquely identify the person(s) exposed to the media. That is, the AME cannot determine whether two reported impressions are associated with the same person or two separate people. The AME may set a cookie on the client devices reporting the monitoring information to identify when multiple impressions occur using the same device. However, cookie information does not indicate whether the same person used the client in connection with each media impression. Furthermore, the same person may access media using multiple different devices that have different cookies so that the AME cannot directly determine when two separate impressions are associated with the same person or two different people.

Furthermore, the monitoring information reported by a client executing the beacon instructions does not provide an indication of the demographics or other user information associated with the person(s) exposed to the associated media. To at least partially address this issue, the AME establishes a panel of users who have agreed to provide their demographic information and to have their Internet browsing activities monitored. When an individual joins the panel, they provide detailed information concerning their identity and demographics (e.g., gender, race, income, home location, occupation, etc.) to the AME. The AME sets a cookie on the panelist computer that enables the AME to identify the panelist whenever the panelist accesses tagged media and, thus, sends monitoring information to the AME. Since most of the client devices providing monitoring information from the tagged pages are not panelists and, thus, are unknown to the AME, it is necessary to use statistical methods to impute demographic information based on the data collected for panelists to the larger population of users providing data for the tagged media. However, panel sizes of AMEs remain small compared to the general population of users. Thus, a problem is presented as to how to increase panel sizes while ensuring the demographics data of the panel is accurate.

Database proprietors operate on the Internet. These database proprietors provide services (e.g., social networking services, email services, media access services, etc.) to large numbers of subscribers. In exchange for the provision of such services, the subscribers register with the proprietors. As part of this registration, the subscribers provide detailed demographic information. Examples of such database proprietors include social network providers such as Facebook, Myspace, Twitter, etc. These database proprietors set cookies on the computers of their subscribers to enable the database proprietors to recognize registered users when such registered users visit their websites.

Unlike traditional media measurement techniques in which AMEs rely solely on their own panel member data to collect demographics-based audience measurement, example methods, apparatus, and/or articles of manufacture disclosed herein enable an AME to share demographic information with other entities that operate based on user registration models. As used herein, a user registration model is a model in which users subscribe to services of those entities by creating an account and providing demographic-related information about themselves. Sharing of demographic information associated with registered users of database proprietors enables an AME to extend or supplement their panel data with substantially reliable demographics information from external sources (e.g., database proprietors), thus extending the coverage, accuracy, and/or completeness of their demographics-based audience measurements, and vice versa. Furthermore, methods, apparatus, and/or articles of manufacture disclosed herein compare the demographics information collected by an AME with the demographics information collected by an example database proprietor to determine the quality of each set of demographics information. Such access also enables the AME to monitor persons who would not otherwise have joined an AME panel. Any web service provider entity having a database identifying demographics of a set of individuals may cooperate with the AME. Such entities may be referred to as "database proprietors" and include entities such as wireless service carriers, mobile software/service providers, social medium sites (e.g., Facebook, Twitter, MySpace, etc.), online retailer sites (e.g., Amazon.com, Buy.com, etc.), multi-service sites (e.g., Yahoo!, Google, Experian, etc.), and/or any other Internet sites that collect demographic data of users and/or otherwise maintain user registration records.

The use of demographic information from disparate data sources (e.g., high-quality demographic information from the panels of an audience measurement entity and/or registered user data of web service providers) results in improved reporting effectiveness of metrics for both online and offline advertising campaigns. After using online registration data to identify demographics of users, and/or other user information, and using server impression counts, and/or other techniques to track quantities of impressions attributable to those users, example disclosed herein compare the impression counts determined by the AME with impression counts from an example database proprietor.

Just as database proprietors may share demographic information that matches collected cookie information of unique individuals to enable an AME to assess the demographic composition of an audience, examples disclosed herein leverage information from database proprietors by comparing the impression counts generated by the database proprietor with the impression counts generated by the AME to improve data quality analysis of the AME. In some examples, the impression counts may aggregate impression counts and daily impression counts from the AME and the database proprietor. However, any summary or aggregated statistics of the total number of unique audience members, total number of impressions experienced by the audience members, or frequency of impressions may be used.

While a database proprietor may be able to match the cookies associated with a portion of individuals exposed to media, there may be at least some individuals whose demographic information is unavailable to the database proprietor. Where the database proprietor cannot identify the person associated with a particular media impression as reported to an AME, the database proprietor likewise cannot specify the frequency of media impressions associated with the person. Thus, the summary statistics provided by a database provider, including any breakdown of the data by demographics within separate buckets of frequency impressions, may be limited to user-identified impressions corresponding to user-identified individuals (e.g., individuals identifiable by a database proprietor) to the exclusion of unidentified impressions associated with individuals whom the database proprietor is unable to uniquely identify.

Examples disclosed herein compare impression data (e.g., impression counts, demographic counts, etc.) collected by an AME with impression data collected by a database proprietor to generate a final weight score for each impression data point. Examples disclosed herein enable AME's to determine a quality of a data point relative to other data points. Examples disclosed herein enable an AME to efficiently allocate resources to the most affected (e.g., worst) data points, thereby improving the accuracy and effectiveness of digital ad ratings for media campaigns.

As used herein, the term "census" when used in the context of audience measurements refers to the audience measurements that account for all instances of media exposure by all individuals in the total population of a target market for the media being monitored. The term census may be contrasted with the term "user-identified" that, as used herein, refers to the media exposures that can be specifically matched to unique individuals identifiable by a database proprietor because such individuals are registered users of the services provided by the database proprietor. Furthermore, as used herein, "census data" refers to data collected by the example AME.

FIG. 1A is an example communication environment 100 including an example audience measurement entity (AME) 102 to collect audience measurement data include impressions of media accessed on, and reported by, an example client device 104. The example environment 100 includes an example database proprietor 106, example media 110, example beacon instructions 112, an example first beacon/impression request 114, an example AME impression collector 116, an example media identifier 118, an example device/user identifier 120, an example beacon response 122, an example second beacon/impression request 124, an example device/user identifier 126, an example modified identifier map 128, an example database proprietor impressions collector 130, and example data quality analyzation circuitry 190.

The AME 102 of FIG. 1A does not provide the media 110 to the client device 104 and is a trusted (e.g., neutral) third party (e.g., The Nielsen Company, LLC) for providing accurate media access (e.g., exposure) statistics. The example AME 102 includes the example data quality analyzation circuitry 190, as further described below. The AME 102 communicates with a database proprietor 106 to collect demographic information associated with audience members exposed to media.

The database proprietor 106 maintains user account records corresponding to users registered for services (such as Internet-based services) provided by the database proprietors. That is, in exchange for the provision of services, subscribers register with the database proprietor 106. As part of this registration, the subscribers provide detailed demographic information to the database proprietor 106. Demographic information may include, for example, gender, age, ethnicity, income, home location, education level, occupation, etc. In the illustrated example, the database proprietor 106 sets a device/user identifier on a subscriber's client device 104 that enables the database proprietor 106 to identify the subscriber. In some examples, the database proprietor 106 may provide summary or aggregate statistics indicative of the unique audience sizes and associated impression counts for different frequency intervals associated with audience members identified by the database proprietor 106. In some examples, the summary statistics may be further broken down by different demographic characteristics.

The example client device 104 of FIG. 1A is a computing device capable of outputting the media 110 to a user. For example, the client device 104 may be a computer, a tablet, a smart phone, a smart television, and/or any other device capable of outputting the media 110. The media 110 may be audio (e.g., a song, podcast, radio, audiobook, etc.), a video (e.g., a movie, advertisement, television show, video clip, etc.), an advertisement, text, a graphic, a web page, news, educational media, entertainment media, etc. In response to a client device 104 accessing the media 110, the client device 104 reports an impression to the AME 102 and/or the database proprietor 106. In some examples, the client device 104 reports impressions for accessed media based on instructions (e.g., beacon instructions) embedded in the media that cause the client device 104 (e.g., by instructing a web browser or an app in the client device 104) to send beacon/impression requests to the AME 102 and/or the database proprietor 106. In such examples, media having beacon instructions is referred to as tagged media. In some examples, the client device 104 reports impressions for accessed media based on instructions embedded in apps or web browsers that execute on the client device 104 to send beacon/impression requests to the AME 102 and/or the database proprietor 106 for corresponding media accessed via the apps or web browsers. In any case, the beacon/impression requests include device/user identifiers (IDs) (e.g., AME IDs and/or database proprietor IDs) to allow the corresponding AME 102 and/or the corresponding database proprietor 106 to associate demographic information with resulting logged impressions. Demographic impressions are impressions that can be associated with particular individuals for whom specific demographic information is known.

In the illustrated example of FIG. 1A, the client device 104 accesses media 110 that is tagged with the beacon instructions 112. The beacon instructions 112 cause the client device 104 to send a beacon/impression request 114 to an AME impressions collector 116 when the client device 104 accesses the media 110. For example, a web browser and/or app of the client device 104 executes the beacon instructions 112 in the media 110 which causes the browser and/or app to generate and send the beacon/impression request 114. In the illustrated example, the client device 104 sends the beacon/impression request 114 using a network communication including an HTTP (hypertext transfer protocol) request addressed to the URL (uniform resource locator) of the AME impressions collector 116 at, for example, a first internet domain of the AME 102. The beacon/impression request 114 of the illustrated example includes a media identifier 118 (e.g., an identifier that can be used to identify content, an advertisement, and/or any other media) corresponding to the media 110. In some examples, the beacon/impression request 114 also includes a site identifier (e.g., a URL) of the website that served the media 110 to the client device 104 and/or a host website ID (e.g., www.acme.com) of the website that displays or presents the media 110. In the illustrated example, the beacon/impression request 114 includes a device/user identifier 120. In the illustrated example, the device/user identifier 120 that the client device 104 provides to the AME impressions collector 116 in the beacon impression request 114 is an AME ID because it corresponds to an identifier that the AME 102 uses to identify a panelist corresponding to the client device 104. In some examples, the client device 104 may not send the device/user identifier 120 until the client device 104 receives a request for the same from a server of the AME 102 in response to, for example, the AME impressions collector 116 receiving the beacon/impression request 114.

In some examples, the device/user identifier 120 may include a hardware identifier (e.g., an international mobile equipment identity (IMEI), a mobile equipment identifier (MEID), a media access control (MAC) address, etc.), an app store identifier (e.g., a Google Android ID, an Apple ID, an Amazon ID, etc.), a unique device identifier (UDID) (e.g., a non-proprietary UDID or a proprietary UDID such as used on the Microsoft Windows platform), an open source unique device identifier (OpenUDID), an open device identification number (ODIN), a login identifier (e.g., a username), an email address, user agent data (e.g., application type, operating system, software vendor, software revision, etc.), an Ad-ID (e.g., an advertising ID introduced by Apple, Inc. for uniquely identifying mobile devices for the purposes of serving advertising to such mobile devices), an Identifier for Advertisers (IDFA) (e.g., a unique ID for Apple iOS devices that mobile ad networks can use to serve advertisements), a Google Advertising ID, a Roku ID (e.g., an identifier for a Roku OTT device), a third-party service identifier (e.g., advertising service identifiers, device usage analytics service identifiers, demographics collection service identifiers), web storage data, document object model (DOM) storage data, local shared objects (also referred to as "Flash cookies"), and/or any other identifier that the AME 102 stores in association with demographic information about users of the client devices 104. In this manner, when the AME 102 receives the device/user identifier 120, the AME 102 can obtain demographic information corresponding to a user of the client device 104 based on the device/user identifier 120 that the AME 102 receives from the client device 104. In some examples, the device/user identifier 120 may be encrypted (e.g., hashed) at the client device 104 so that an intended final recipient of the device/user identifier 120 can decrypt the hashed identifier 120. For example, if the device/user identifier 120 is a cookie that is set in the client device 104 by the AME 102, the device/user identifier 120 can be hashed so that the AME 102 can decrypt the device/user identifier 120. If the device/user identifier 120 is an IMEI number, the client device 104 can hash the device/user identifier 120 so that a wireless carrier (e.g., the database proprietor 106) can decrypt the hashed identifier 120 to recover the IMEI for use in accessing demographic information corresponding to the user of the client device 104. By hashing the device/user identifier 120, an intermediate party (e.g., an intermediate server or entity on the Internet) receiving the beacon request cannot directly identify a user of the client device 104.

In response to receiving the beacon/impression request 114, the AME impressions collector 116 logs an impression for the media 110 by storing the media identifier 118 contained in the beacon/impression request 114. In the illustrated example of FIG. 1A, the AME impressions collector 116 also uses the device/user identifier 120 in the beacon/impression request 114 to identify AME panelist demographic information corresponding to a panelist of the client device 104. That is, the device/user identifier 120 matches a user ID of a panelist member (e.g., a panelist corresponding to a panelist profile maintained and/or stored by the AME 102). In this manner, the AME impressions collector 116 can associate the logged impression with demographic information of a panelist corresponding to the client device 104.

The beacon/impression request 114 of FIG. 1A may not include the device/user identifier 120 if, for example, the user of the client device 104 is not an AME panelist. In such examples, the AME impressions collector 116 logs impressions regardless of whether the client device 104 provides the device/user identifier 120 in the beacon/impression request 114 (or in response to a request for the identifier 120). When the client device 104 does not provide the device/user identifier 120, the AME impressions collector 116 will still benefit from logging an impression for the media 110 even though it will not have corresponding demographics (e.g., an impression may be collected as a census impression). For example, the AME 102 may still use the logged impression to generate a total impressions count and/or a frequency of impressions (e.g., an impressions frequency) for the media 110. Additionally or alternatively, the AME 102 may obtain demographics information from the database proprietor 106 for the logged impression if the client device 104 corresponds to a subscriber of the database proprietor 106.

In the illustrated example of FIG. 1A, to compare or supplement panelist demographics (e.g., for accuracy or completeness) of the AME 102 with demographics from one or more database proprietors (e.g., the database proprietor 106), the AME impressions collector 116 returns a beacon response message 122 (e.g., a first beacon response) to the client device 104 including an HTTP "302 Found" re-direct message and a URL of a participating database proprietor 106 at, for example, a second internet domain. In the illustrated example, the HTTP "302 Found" re-direct message in the beacon response 122 instructs the client device 104 to send a second beacon request 124 to the database proprietor 106. In some examples, instead of using an HTTP "302 Found" re-direct message, redirects may be implemented using, for example, an iframe source instruction (e.g., <iframe src=" ">) or any other instruction that can instruct a client device to send a subsequent beacon request (e.g., the second beacon request 124) to a participating database proprietor 106. In the illustrated example, the AME impressions collector 116 determines (e.g., identifies) the database proprietor 106 specified in the beacon response 122 using a rule and/or any other suitable type of selection criteria or process. In some examples, the AME impressions collector 116 determines a particular database proprietor to which to redirect a beacon request based on, for example, empirical data indicative of which database proprietor is most likely to have demographic data for a user corresponding to the device/user identifier 120. In some examples, the beacon instructions 112 include a predefined URL of one or more database proprietors to which the client device 104 should send follow up beacon requests 124. In some examples, the same database proprietor is always identified in the first redirect message (e.g., the beacon response 122).

In the illustrated example of FIG. 1A, the beacon/impression request 124 may include a device/user identifier 126 that is a database proprietor ID because it is used by the database proprietor 106 to identify a subscriber of the client device 104 when logging an impression. In some instances (e.g., in which the database proprietor 106 has not yet set a database proprietor ID in the client device 104), the beacon/impression request 124 does not include the device/user identifier 126. In some examples, the database proprietor ID is not sent until the database proprietor 106 requests the same (e.g., in response to the beacon/impression request 124). In some examples, the device/user identifier 126 is a device identifier (e.g., an international mobile equipment identity (IMEI), a mobile equipment identifier (MEID), a media access control (MAC) address, etc.), a web browser unique identifier (e.g., a cookie), a user identifier (e.g., a user name, a login ID, etc.), an Adobe Flash® client identifier, identification information stored in an HTML5 datastore, and/or any other identifier that the database proprietor 106 stores in association with demographic information about subscribers corresponding to the client devices 104. In response to the database proprietor 106 receiving the device/user identifier 126, the database proprietor 106 obtains demographic information corresponding to a user of the client device 104 based on the device/user identifier 126 that the database proprietor 106 received from the client device 104. In some examples, the device/user identifier 126 may be encrypted (e.g., hashed) at the client device 104 so that an intended final recipient of the device/user identifier 126 can decrypt the hashed identifier 126. For example, if the device/user identifier 126 is a cookie that is set in the client device 104 by the database proprietor 106, the device/user identifier 126 can be hashed so that the database proprietor 106 can decrypt the device/user identifier 126. If the device/user identifier 126 is an IMEI number, the client device 104 hashes the device/user identifier 126 so that a wireless carrier (e.g., the database proprietor 106) can decrypt the hashed identifier 126 to recover the IMEI for use in accessing demographic information corresponding to the user of the client device 104. By hashing the device/user identifier 126, an intermediate party (e.g., an intermediate server or entity on the Internet) receiving the beacon request cannot directly identify a user of the client device 104. For example, if the intended final recipient of the device/user identifier 126 is the database proprietor 106, the AME 102 cannot recover identifier information when the device/user identifier 126 is hashed by the client device 104 for decrypting by the intended database proprietor 106.

Although a single database proprietor 106 is shown in FIG. 1A, the environment 100 may include multiple database proprietors. In some such examples, the beacon instructions 112 cause the client device 104 to send beacon/impression requests 124 to numerous database proprietors. For example, the beacon instructions 112 may cause the client device 104 to send the beacon/impression requests 124 to the numerous database proprietors in parallel or in daisy chain fashion. In some examples, the beacon instructions 112 cause the client device 104 to stop sending beacon/impression requests 124 to database proprietors after a database proprietor has recognized the client device 104. In some examples, the beacon instructions 112 cause the client device 104 to send beacon/impression requests 124 to the database proprietors so that the multiple database proprietors can recognize the client device 104 and log a corresponding impression. The multiple database proprietors are provided to log impressions and provide corresponding demographics information if the user of the client device 104 is a subscriber of services of the corresponding database proprietors.

In some examples, prior to sending the beacon response 122 to the client device 104, the AME impressions collector 116 replaces site IDs (e.g., URLs) of media provider(s) that served the media 110 with modified site IDs (e.g., substitute site IDs) which are discernible by the AME 102 to identify the media provider(s). In some examples, the AME impressions collector 116 may also replace a host website ID (e.g., www.acme.com) with a modified host site ID (e.g., a substitute host site ID) which is discernible by the AME 102 as corresponding to the host website via which the media 110 is presented. In some examples, the AME impressions collector 116 also replaces the media identifier 118 with the modified media identifier 118 corresponding to the media 110. In this way, the media provider of the media 110, the host website that presents the media 110, and/or the media identifier 118 are obscured from the database proprietor 106, but the database proprietor 106 can still log impressions based on the modified values which can later be deciphered by the AME 102 after the AME 102 receives logged impressions from the database proprietor 106. In some examples, the AME impressions collector 116 does not send site IDs, host site IDS, the media identifier 118 or modified versions thereof in the beacon response 122. In such examples, the client device 104 provides the original, non-modified versions of the media identifier 118, site IDs, host IDs, etc. to the database proprietor 106.

In the illustrated example, the AME impression collector 116 maintains a modified ID mapping table 128 that maps original site IDs with modified (or substitute) site IDs, original host site IDs with modified host site IDs, and/or maps modified media identifiers to the media identifiers such as the media identifier 118 to obfuscate or hide such information from database proprietors such as the database proprietor 106. Also in the illustrated example, the AME impressions collector 116 may encrypt the information received in the beacon/impression request 114 and the modified information to prevent any intercepting parties from decoding the information. The AME impressions collector 116 of the illustrated example sends the encrypted information in the beacon response 122 to the client device 104 so that the client device 104 can send the encrypted information to the database proprietor 106 in the beacon/impression request 124. In the illustrated example, the AME impressions collector 116 uses an encryption that can be decrypted by the database proprietor 106 site specified in the HTTP "302 Found" re-direct message.

Periodically or aperiodically, the audience measurement data collected by the database proprietor 106 is provided to the database proprietor impressions collector 130 of the AME 102 (e.g., as batch data). In some examples, the audience measurement data may be combined or aggregated to generate a media impression frequency distribution for individuals exposed to the media 110 that the database proprietor 106 was able to identify (e.g., based on the device/user identifier 126). During a data collecting and merging process to combine demographic and audience measurement data from the AME 102 and the database proprietor(s) 106, impressions logged by the AME 102 for the client devices 104 that do not have a database proprietor ID will not correspond to impressions logged by the database proprietor 106 because the database proprietor 106 typically does not log impressions for the client devices that do not have database proprietor IDs.

Additional examples that may be used to implement the beacon instruction processes of FIG. 1A are disclosed in Mainak et al., U.S. Pat. No. 8,370,489, which is hereby incorporated herein by reference in its entirety. In addition, other examples that may be used to implement such beacon instructions are disclosed in Blumenau, U.S. Pat. No. 6,108,637, referred to above.

The example data quality analyzation circuitry 190 of FIG. 1A is implemented by a computer/processor system (e.g., the processor system 700 of FIG. 7) to calculate a weight score for impression data points collected by the AME and an example database proprietor (DP). The example data quality analyzation circuitry 190 is further described below in conjunction with FIG. 2.

Figure 1B:
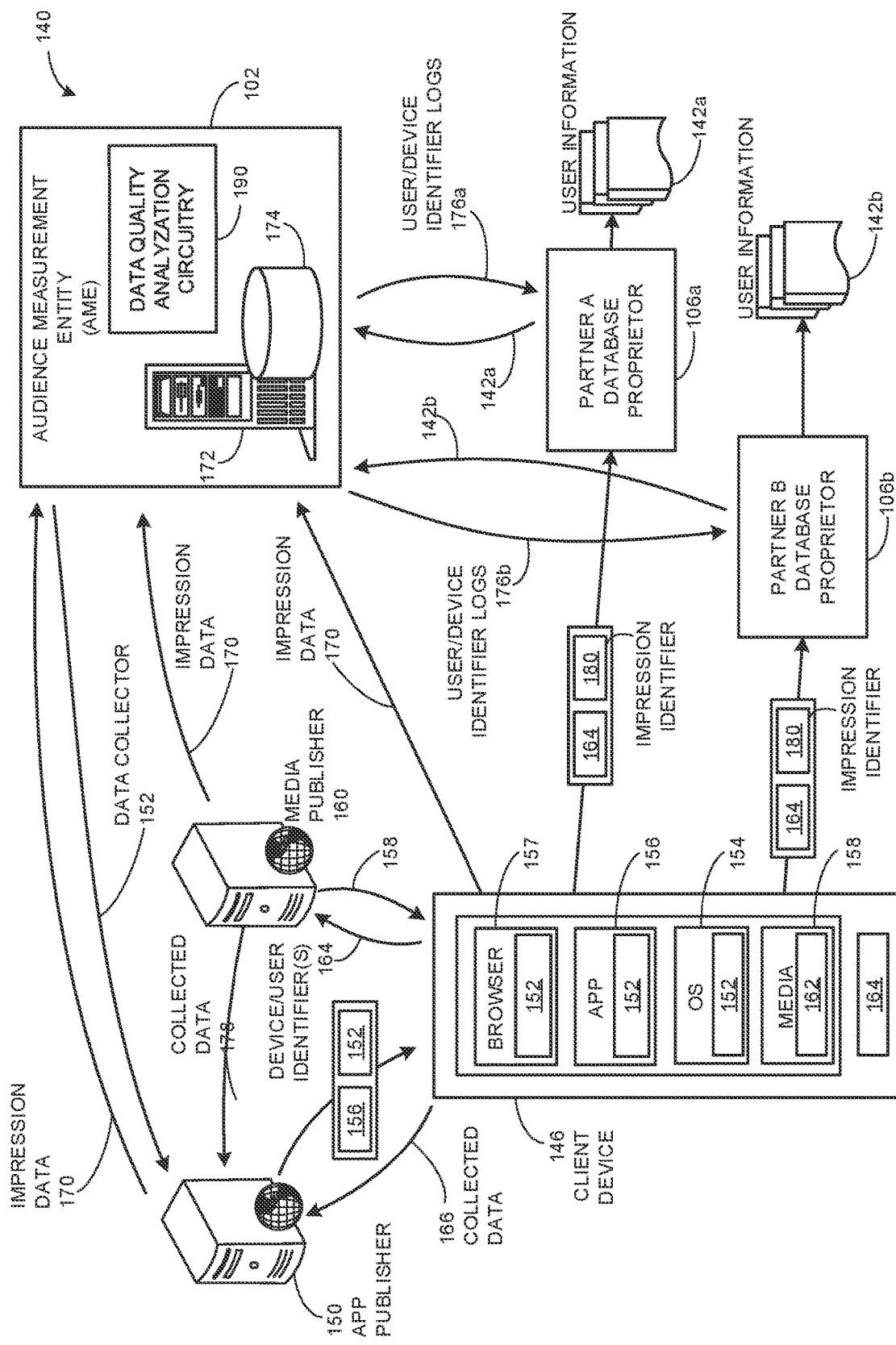
FIG. 1B depicts an example system to collect impressions of media presented on mobile devices and to collect impression information from distributed database proprietors for associating with the collected impressions.

FIG. 1B depicts an alternative example environment 142 to collect impression information based on user information 142a, 142b from distributed database proprietors 106 (designated as 106a and 106b in FIG. 1B) for associating with impressions of media presented at a client device 146. In some examples, components of FIGS. 1A and 1B may be combined and/or switched. In the illustrated examples, user information 142a, 142b or user data includes one or more of demographic data, purchase data, and/or other data indicative of user activities, behaviors, and/or preferences related to information accessed via the Internet, purchases, media accessed on electronic devices, physical locations (e.g., retail or commercial establishments, restaurants, venues, etc.) visited by users, etc. Thus, the user information 142a, 142b may indicate and/or be analyzed to determine the impression frequency of individual users with respect to different media accessed by the users. In some examples, such impression information, may be combined or aggregated to generate a media impression frequency distribution for all users exposed to particular media for whom the database proprietor has particular user information 142a, 142b. More particularly, in the illustrated example of FIG. 1B, the AME 102 includes the example data quality analyzation circuitry 190 to compare the collected impression data of the AME and the database proprietor(s) to generate a weight score that describes the quality of each data point, as described below.

In the illustrated example of FIG. 1B, the client device 146 may be a mobile device (e.g., a smart phone, a tablet, etc.), an internet appliance, a smart television, an internet terminal, a computer, or any other device capable of presenting media received via network communications. In some examples, to track media impressions on the client device 146, an audience measurement entity (AME) 102 partners with or cooperates with an app publisher 150 to download and install a data collector 152 on the client device 146. The app publisher 150 of the illustrated example may be a software app developer that develops and distributes apps to mobile devices and/or a distributor that receives apps from software app developers and distributes the apps to mobile devices. The data collector 152 may be included in other software loaded onto the client device 146, such as the operating system 154, an application (or app) 156, a web browser 117, and/or any other software.

Any of the example software 154, 156, 117 may present media 158 received from a media publisher 160. The media 158 may be an advertisement, video, audio, text, a graphic, a web page, news, educational media, entertainment media, or any other type of media. In the illustrated example, a media ID 162 is provided in the media 158 to enable identifying the media 158 so that the AME 102 can credit the media 158 with media impressions when the media 158 is presented on the client device 146 or any other device that is monitored by the AME 102.

The data collector 152 of the illustrated example includes instructions (e.g., Java, java script, or any other computer language or script) that, when executed by the client device 146, cause the client device 146 to collect the media ID 162 of the media 158 presented by the app program 156, the browser 117, and/or the client device 146, and to collect one or more device/user identifier(s) 164 stored in the client device 146. The device/user identifier(s) 164 of the illustrated example include identifiers that can be used by corresponding ones of the partner database proprietors 106a-b to identify the user or users of the client device 146, and to locate user information 142a-b corresponding to the user(s). For example, the device/user identifier(s) 164 may include hardware identifiers (e.g., an international mobile equipment identity (IMEI), a mobile equipment identifier (MEID), a media access control (MAC) address, etc.), an app store identifier (e.g., a Google Android ID, an Apple ID, an Amazon ID, etc.), a unique device identifier (UDID) (e.g., a non-proprietary UDID or a proprietary UDID such as used on the Microsoft Windows platform), an open source unique device identifier (OpenUDID), an open device identification number (ODIN), a login identifier (e.g., a username), an email address, user agent data (e.g., application type, operating system, software vendor, software revision, etc.), an Ad-ID (e.g., an advertising ID introduced by Apple, Inc. for uniquely identifying mobile devices for the purposes of serving advertising to such mobile devices), an Identifier for Advertisers (IDFA) (e.g., a unique ID for Apple iOS devices that mobile ad networks can use to serve advertisements), a Google Advertising ID, a Roku ID (e.g., an identifier for a Roku OTT device), third-party service identifiers (e.g., advertising service identifiers, device usage analytics service identifiers, demographics collection service identifiers), web storage data, document object model (DOM) storage data, local shared objects (also referred to as "Flash cookies"), etc. In examples in which the media 158 is accessed using an application and/or browser (e.g., the app 156 and/or the browser 117) that do not employ cookies, the device/user identifier(s) 164 are non-cookie identifiers such as the example identifiers noted above. In examples in which the media 158 is accessed using an application or browser that does employ cookies, the device/user identifier(s) 164 may additionally or alternatively include cookies. In some examples, fewer or more device/user identifier(s) 164 may be used. In addition, although two partner database proprietors 106a-b are shown in FIG. 1, the AME 102 may partner with any number of partner database proprietors to collect distributed user information (e.g., the user information 142a-b).

In some examples, the client device 146 may not allow access to identification information stored in the client device 146. For such instances, the disclosed examples enable the AME 102 to store an AME-provided identifier (e.g., an identifier managed and tracked by the AME 102) in the client device 146 to track media impressions on the client device 146. For example, the AME 102 may provide instructions in the data collector 152 to set an AME-provided identifier in memory space accessible by and/or allocated to the app program 156 and/or the browser 117, and the data collector 152 uses the identifier as a device/user identifier 164. In such examples, the AME-provided identifier set by the data collector 152 persists in the memory space even when the app program 156 and the data collector 152 and/or the browser 117 and the data collector 152 are not running. In this manner, the same AME-provided identifier can remain associated with the client device 146 for extended durations. In some examples in which the data collector 152 sets an identifier in the client device 146, the AME 102 may recruit a user of the client device 146 as a panelist, and may store user information collected from the user during a panelist registration process and/or collected by monitoring user activities/behavior via the client device 146 and/or any other device used by the user and monitored by the AME 102. In this manner, the AME 102 can associate user information of the user (from panelist data stored by the AME 102) with media impressions attributed to the user on the client device 146. As used herein, a panelist is a user registered on a panel maintained by a ratings entity (e.g., the AME 102) that monitors and estimates audience exposure to media.

In the illustrated example, the data collector 152 sends the media ID 162 and the one or more device/user identifier(s) 164 as collected data 166 to the app publisher 150. Alternatively, the data collector 152 may be configured to send the collected data 166 to another collection entity (other than the app publisher 150) that has been contracted by the AME 102 or is partnered with the AME 102 to collect media ID's (e.g., the media ID 162) and device/user identifiers (e.g., the device/user identifier(s) 164) from user devices (e.g., the client device 146). In the illustrated example, the app publisher 150 (or a collection entity) sends the media ID 162 and the device/user identifier(s) 164 as impression data 170 to an impression collector 172 (e.g., an impression collection server or a data collection server) at the AME 102. The impression data 170 of the illustrated example may include one media ID 162 and one or more device/user identifier(s) 164 to report a single impression of the media 158, or it may include numerous media ID's 162 and device/user identifier(s) 164 based on numerous instances of collected data (e.g., the collected data 166) received from the client device 146 and/or other devices to report multiple impressions of media.

In the illustrated example, the impression collector 172 stores the impression data 170 in an AME media impressions store 174 (e.g., a database or other data structure). Subsequently, the AME 102 sends the device/user identifier(s) 164 to corresponding partner database proprietors (e.g., the partner database proprietors 106a-b) to receive user information (e.g., the user information 142a-b) corresponding to the device/user identifier(s) 164 from the partner database proprietors 106a-b so that the AME 102 can associate the user information with corresponding media impressions of media (e.g., the media 158) presented at the client device 146.

More particularly, in some examples, after the AME 102 receives the device/user identifier(s) 164, the AME 102 sends device/user identifier logs 176a-b to corresponding partner database proprietors (e.g., the partner database proprietors 106a-b). Each of the device/user identifier logs 176a-b may include a single device/user identifier 164, or it may include numerous aggregate device/user identifiers 164 received over time from one or more devices (e.g., the client device 146). After receiving the device/user identifier logs 176a-b, each of the partner database proprietors 106a-b looks up its users corresponding to the device/user identifiers 164 in the respective logs 176a-b. In this manner, each of the partner database proprietors 106a-b collects user information 142a-b corresponding to users identified in the device/user identifier logs 176a-b for sending to the AME 102. For example, if the partner database proprietor 106a is a wireless service provider and the device/user identifier log 176a includes IMEI numbers recognizable by the wireless service provider, the wireless service provider accesses its subscriber records to find users having IMEI numbers matching the IMEI numbers received in the device/user identifier log 176a. When the users are identified, the wireless service provider copies the users 'user information to the user information 142a for delivery to the AME 102.

In some other examples, the data collector 152 is configured to collect the device/user identifier(s) 164 from the client device 146. The example data collector 152 sends the device/user identifier(s) 164 to the app publisher 150 in the collected data 166, and it also sends the device/user identifier(s) 164 to the media publisher 160. In such other examples, the data collector 152 does not collect the media ID 162 from the media 158 at the client device 146 as the data collector 152 does in the example system 142 of FIG. 1B. Instead, the media publisher 160 that publishes the media 158 to the client device 146 retrieves the media ID 162 from the media 158 that it publishes. The media publisher 160 then associates the media ID 162 to the device/user identifier(s) 164 received from the data collector 152 executing in the client device 146, and sends collected data 178 to the app publisher 150 that includes the media ID 162 and the associated device/user identifier(s) 164 of the client device 146. For example, when the media publisher 160 sends the media 158 to the client device 146, it does so by identifying the client device 146 as a destination device for the media 158 using one or more of the device/user identifier(s) 164 received from the client device 146. In this manner, the media publisher 160 can associate the media ID 162 of the media 158 with the device/user identifier(s) 164 of the client device 146 indicating that the media 158 was sent to the particular client device 146 for presentation (e.g., to generate an impression of the media 158).

In some other examples in which the data collector 152 is configured to send the device/user identifier(s) 164 to the media publisher 160, the data collector 152 does not collect the media ID 162 from the media 158 at the client device 146. Instead, the media publisher 160 that publishes the media 158 to the client device 146 also retrieves the media ID 162 from the media 158 that it publishes. The media publisher 160 then associates the media ID 162 with the device/user identifier(s) 164 of the client device 146. The media publisher 160 then sends the media impression data 170, including the media ID 162 and the device/user identifier(s) 164, to the AME 102. For example, when the media publisher 160 sends the media 158 to the client device 146, it does so by identifying the client device 146 as a destination device for the media 158 using one or more of the device/user identifier(s) 164. In this manner, the media publisher 160 can associate the media ID 162 of the media 158 with the device/user identifier(s) 164 of the client device 146 indicating that the media 158 was sent to the particular client device 146 for presentation (e.g., to generate an impression of the media 158). In the illustrated example, after the AME 102 receives the impression data 170 from the media publisher 160, the AME 102 can then send the device/user identifier logs 176a-b to the partner database proprietors 106a-b to request the user information 142a-b as described above.

Although the media publisher 160 is shown separate from the app publisher 150 in FIG. 1, the app publisher 150 may implement at least some of the operations of the media publisher 160 to send the media 158 to the client device 146 for presentation. For example, advertisement providers, media providers, or other information providers may send media (e.g., the media 158) to the app publisher 150 for publishing to the client device 146 via, for example, the app program 156 when it is executing on the client device 146. In such examples, the app publisher 150 implements the operations described above as being performed by the media publisher 160.

Additionally or alternatively, in contrast with the examples described above in which the client device 146 sends identifiers to the audience measurement entity 102 (e.g., via the application publisher 150, the media publisher 160, and/or another entity), in some examples the client device 146 (e.g., the data collector 152 installed on the client device 146) sends the identifiers (e.g., the device/user identifier(s) 164) directly to the respective database proprietors 106a, 106b (e.g., not via the AME 102). In such examples, the example client device 146 sends the media identifier 162 to the audience measurement entity 102 (e.g., directly or through an intermediary such as via the application publisher 150), but does not send the media identifier 162 to the database proprietors 106a-b.

As mentioned above, the example partner database proprietors 106a-b provide the user information 142a-b to the example AME 102 for matching with the media identifier 162 to form media impression information. As also mentioned above, the database proprietors 106a-b are not provided copies of the media identifier 162. Instead, the client provides the database proprietors 106a-b with impression identifiers 180. An impression identifier uniquely identifies an impression event relative to other impression events of the client device 146 so that an occurrence of an impression at the client device 146 can be distinguished from other occurrences of impressions. However, the impression identifier 180 does not itself identify the media associated with that impression event. In such examples, the impression data 170 from the client device 146 to the AME 102 also includes the impression identifier 180 and the corresponding media identifier 162. To match the user information 142a-b with the media identifier 162, the example partner database proprietors 106a-b provide the user information 142a-b to the AME 102 in association with the impression identifier 180 for the impression event that triggered the collection of the user information 142a-b. In this manner, the AME 102 can match the impression identifier 180 received from the client device 146 to a corresponding impression identifier 180 received from the partner database proprietors 106a-b to associate the media identifier 162 received from the client device 146 with demographic information in the user information 142a-b received from the database proprietors 106a-b. The impression identifier 180 can additionally be used for reducing or avoiding duplication of demographic information. For example, the example partner database proprietors 106a-b may provide the user information 142a-b and the impression identifier 180 to the AME 102 on a per-impression basis (e.g., each time a client device 146 sends a request including an encrypted identifier 164a-b and an impression identifier 180 to the partner database proprietor 106a-b) and/or on an aggregated basis (e.g., send a set of user information 142a-b, which may include indications of multiple impressions (e.g., multiple impression identifiers 180), to the AME 102 presented at the client device 146).

The impression identifier 180 provided to the AME 102 enables the AME 102 to distinguish unique impressions and avoid over counting a number of unique users and/or devices viewing the media. For example, the relationship between the user information 142a from the partner A database proprietor 106a and the user information 142b from the partner B database proprietor 106b for the client device 146 is not readily apparent to the AME 102. By including an impression identifier 180 (or any similar identifier), the example AME 102 can associate user information corresponding to the same user between the user information 142a-b based on matching impression identifiers 180 stored in both of the user information 142a-b. The example AME 102 can use such matching impression identifiers 180 across the user information 142a-b to avoid over counting mobile devices and/or users (e.g., by counting unique users instead of counting the same user multiple times).

A same user may be counted multiple times if, for example, an impression causes the client device 146 to send multiple device/user identifiers to multiple different database proprietors 106a-b without an impression identifier (e.g., the impression identifier 180). For example, a first one of the database proprietors 106a sends first user information 142a to the AME 102, which signals that an impression occurred. In addition, a second one of the database proprietors 106b sends second user information 142b to the AME 102, which signals (separately) that an impression occurred.

In addition, separately, the client device 146 sends an indication of an impression to the AME 102. Without knowing that the user information 142a-b is from the same impression, the AME 102 has an indication from the client device 146 of a single impression and indications from the database proprietors 106a-b of multiple impressions.

To avoid over counting impressions, the AME 102 can use the impression identifier 180. For example, after looking up user information 142a-b, the example partner database proprietors 106a-b transmit the impression identifier 180 to the AME 102 with corresponding user information 142a-b. The AME 102 matches the impression identifier 180 obtained directly from the client device 146 to the impression identifier 180 received from the database proprietors 106a-b with the user information 142a-b to thereby associate the user information 142a-b with the media identifier 162 and to generate impression information. This is possible because the AME 102 received the media identifier 162 in association with the impression identifier 180 directly from the client device 146. Therefore, the AME 102 can map user data from two or more database proprietors 106a-b to the same media exposure event, thus avoiding double counting.

Figure 2:
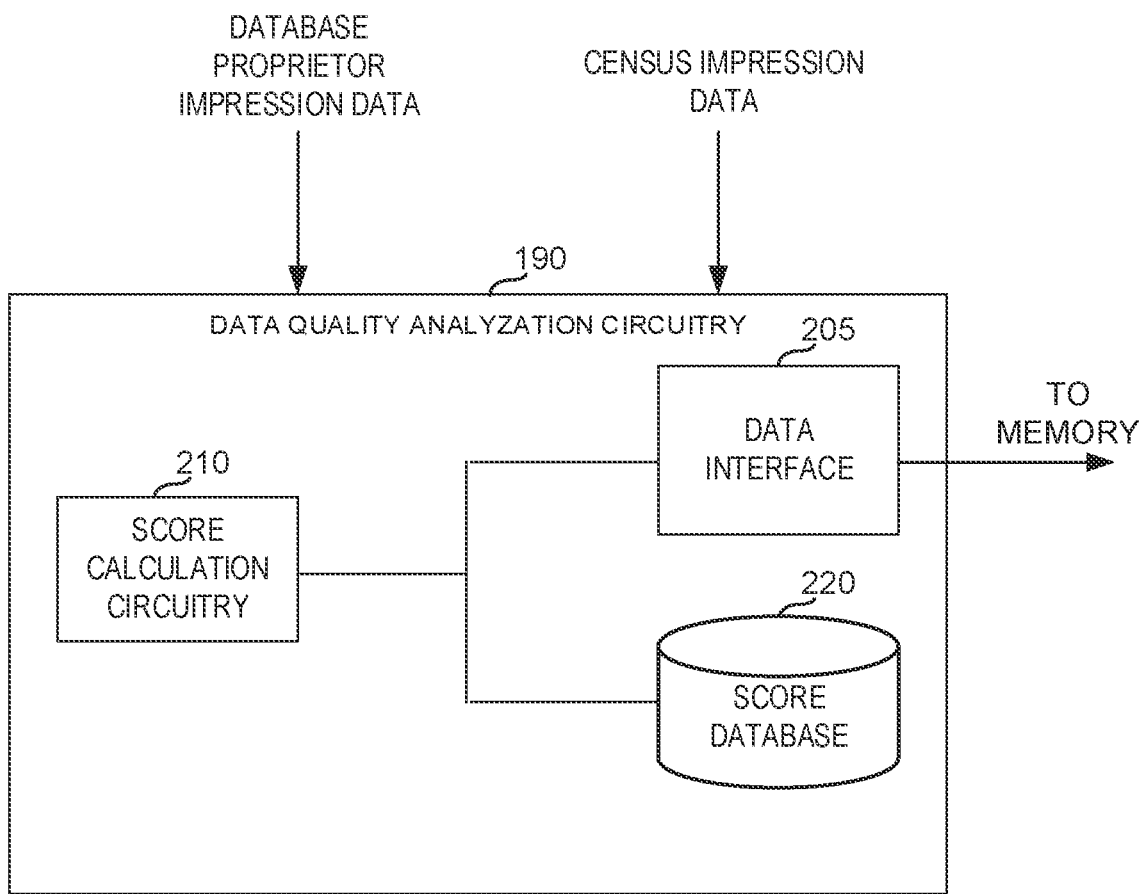
FIG. 2 is a block diagram illustrating an example data quality analyzation circuitry of FIGS. 1A and/or 1B.

FIG. 2 is a block diagram illustrating an example implementation of the example the data quality analyzation circuit 190 of FIGS. 1A and 1B to compare impression data from the example AME 102 and the example database proprietor(s) 106 to generate a final weight score for impression data points. The example data quality analyzation circuit 190 includes an example data interface 205, example score calculation circuitry 210, and an example score database 220.

The example data interface 205 of FIG. 2 accesses impression data points that are collected by the example AME 102 and the example database proprietor(s) 106 from the example database proprietor impressions collector 130, the example impression collector 172, and/or the example AME media impressions store 174. As discussed herein, impression data points include aggregate and daily census impression counts as well as aggregate and daily DP impression counts for advertisement placements. In this example, each impression data point includes a unique site and placement ID, as well as a Campaign ID. The example data interface 205 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), Coarse Grained Reduced precision architecture (CGRA(s)), image signal processor(s) (ISP(s)), etc.

Figure 4:
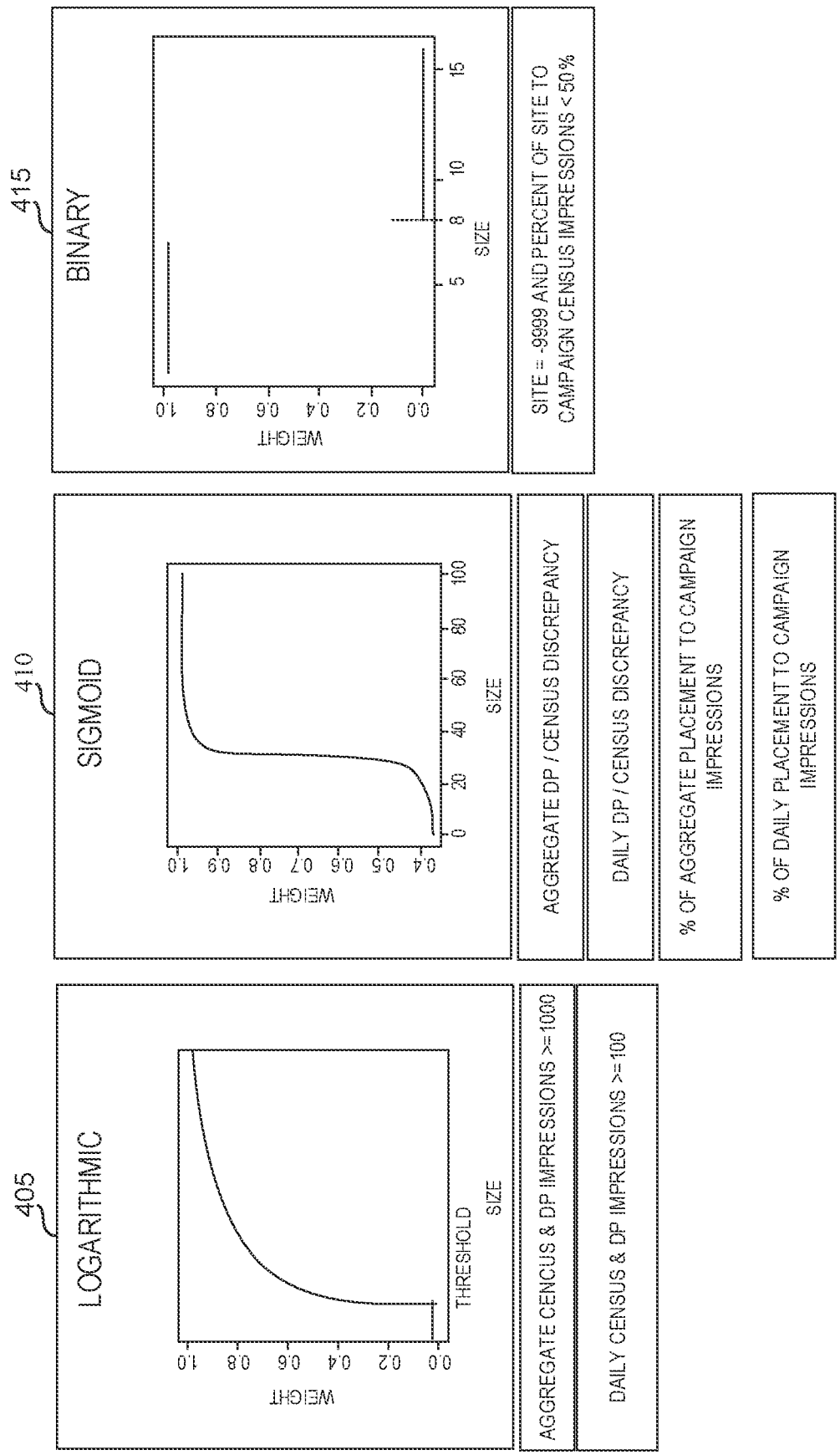
FIG. 4 is a block diagram illustrating the example factor distributions.

The example score calculation circuitry 210 of FIG. 2 calculates a score for each factor of the impression data point included in one or more weight models (e.g., further described in conjunction with FIG. 4) and normalizes the calculated scores according to the example factor distribution determination circuitry 305 illustrated in FIG. 4A. The example score calculation circuitry 210 then calculates a final weight score for the impression data point using the normalized scores (e.g., also referred to as normalized factor scores) for each factor using to the example final weight determination circuitry 310 illustrated in FIG. 5. The final weight score signifies the quality for the specific campaign, site, placement combination, etc. The higher the score, the worse the data quality. Final weight scores that are above a threshold are flagged to be fixed and/or manually examined. Flagging and/or otherwise not using data that corresponds to a high final weight score results in improved data quality and/or identification of bugs in code that correspond to poor data collection. The score calculation circuitry 210 stores the calculated final weight scores in the example score database 220. The example score calculation circuitry 210 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc.

The example score database 220 of FIG. 2 holds the final weight scores calculated by the score calculation circuitry 210. In this example, the score calculation circuitry 210 stores the final weight scores in the score database 220 in ascending normalized weight order from 0 to 1. The example score database 220 of the illustrated example of FIG. 2 is implemented by any memory, storage device and/or storage disc for storing data such as, for example, flash memory, magnetic media, optical media, solid state memory, hard drive(s), thumb drive(s), etc. Furthermore, the data stored in the example score database 220 may be in any data format such as, for example, binary data, comma delimited data, tab delimited data, structured query language (SQL) structures, etc. While, in the illustrated example, the score database 220 is illustrated as a single device, the example score database 220 and/or any other data storage devices described herein may be implemented by any number and/or type(s) of memories. In the illustrated example of FIG. 2, the example score database 220 stores the final weight scores calculated by the example score calculation circuitry 210.

Figure 3:
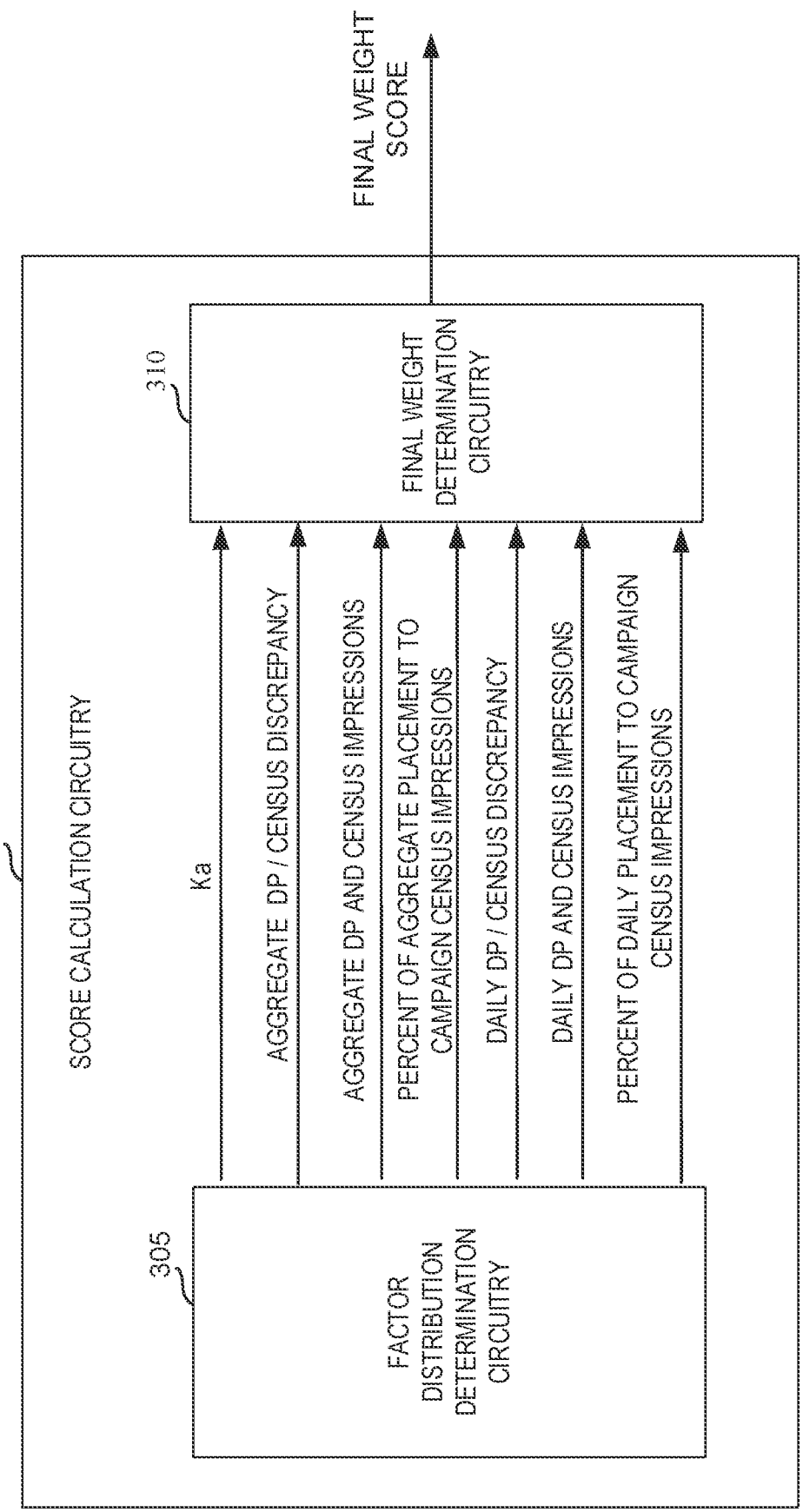
FIG. 3 is a block diagram illustrating the example score calculation circuitry of FIG. 2.

FIG. 3 is a block diagram illustrating an example implementation of the example score calculation circuitry 210 of FIG. 2 used to normalize scores for factors and calculate final weight scores. The example score calculation circuitry 210 includes example factor distribution determination circuitry 305 and an example final weight determination circuitry 310.

The example factor distribution determination circuitry 305 of FIG. 3 outputs factor distribution data that is referenced by the score calculation circuitry 210 to normalize the calculated scores for each factor in the example final weight determination circuitry 310. The example factor distribution determination circuitry 305 may result in an output of at least one of Ka, aggregated DP/census discrepancy (e.g., an aggregate discrepancy factor score), aggressed DPO and census impressions (e.g., an aggregate impression factor score), percent of aggregate placement to campaign cense impressions (e.g., an aggregate percentage value), daily DP/census discrepancy, daily DP and census impressions, and percent of daily placement to campaign census impressions (e.g., daily percentage value), as further described below in conjunction with FIG. 4. The score calculation circuitry 210 calculates a final weight score for each impression data point using the final weight determination circuitry 310. The final weight determination circuitry 310 is further described below in conjunction with FIG. 5.

FIG. 4 is an illustration of the factor distributions generated by and/or the used by the factor distribution determination circuitry 305 to generate output data used by the final weight determination circuitry 310 to generate the final weight score. The factor distribution determination circuitry 305 may generate and/or use an example logarithmic distribution 405, an example sigmoid distribution 410, and an example binary distribution 415. Although FIG. 4 includes three factor distributions, there may be additional or alternative factor distributions.

The first factor distribution 405 of FIG. 4 depicts a logarithmic distribution. The factor distribution determination circuitry 305 uses the logarithmic distribution 405 to normalize the calculated scores for the aggregate census, the DP impressions factor (or aggregate impression factor) the daily census, and/or the DP impressions factor (or daily impression factor) of respective impression data points. In examples disclosed herein, factor distribution determination circuitry 305 calculates the aggregate census and DP impressions factor using overall total number of impressions collected by the database proprietor and/or the AME for a specific advertisement placement. Similarly, the factor distribution determination circuitry 305 calculates the daily census and DP impressions factor using the daily total of impressions collected by the database proprietor and/or the AME for a specific advertisement placement. In this example, the logarithmic distribution 405 includes a minimum impression count threshold for both of these factors. If the aggregate census and DP impressions count for an impression data point is below 1000 impressions, the factor distribution determination circuitry 305 does not normalize any of the scores for any of the factors of that impression data point, and the data interface 205 accesses a new impression data point. In other words, if the aggregate census and DP impressions count for an impression data point is below 1000 impressions, a final weight score is not calculated for that impression data point and that impression data point is not included in the score database 220. Similarly, if the daily census and DP impressions count for an impression data point is below 100 impressions, the factor distribution determination circuitry 305 does not normalize any of the scores for any of the factors of that impression data point, and the data interface 205 accesses a new impression data point. If the aggregate and daily census and DP impression counts for an impression data point are above the required thresholds, the factor distribution determination circuitry 305 normalizes the calculated scores by assigning a score from 0 to 1 for the aggregate census and DP impressions count factor and the daily census and DP impressions count factor relative to the calculated factor scores of other impression data points using the logarithmic distribution 405.

The second factor distribution 410 depicts a sigmoid distribution that the example factor distribution determination circuitry 305 generates to create the aggregate DP, the census discrepancy, the daily DP, the percentage of aggregate placement to campaign impressions, and/or the percentage of daily placement to campaign impressions factors. The percentage of aggregate placement to campaign impressions is a representation of the aggregate census impressions divided by the total aggregate campaign census impressions. The percentage of daily placement to campaign impressions is a representation of the daily census impressions divided by the total daily campaign census impressions.

The third factor distribution 415 depicts a binary distribution. The binary distribution 415 is referenced by the factor distribution determination circuitry 305 to check if there is sufficient data to calculate a final weight score for the impression data point. For some impression data points, the factor distribution determination circuitry 305 may be unable to calculate a score for certain factors because either the census impression data or the DP impression data lacks quantities needed to calculate a score for each factor. If, for example, the website of an advertisement placement is unknown (i.e., Site=−9999), then the factor distribution determination circuitry 305 does not calculate or normalize any of the factors for that impression data point, and thus does not calculate a final weight score for that impression data point. In another example, if a certain website does not generate at least 50% of the total campaign impressions, then the factor distribution determination circuitry 305 does not calculate or normalize factor scores for impression data points for advertisement placements on that website.

Figure 5:
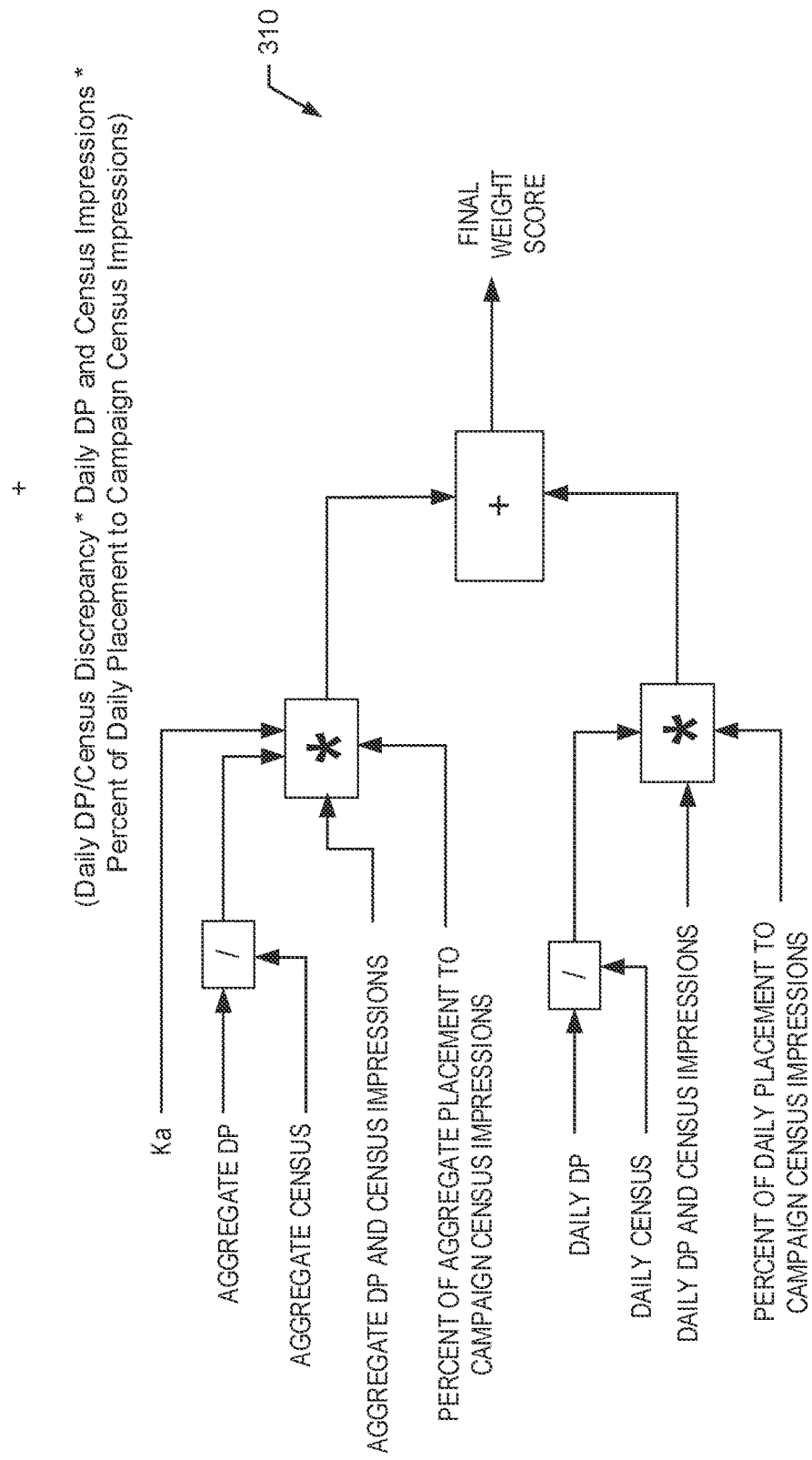
FIG. 5 is an illustration of the example final weight determination circuitry of FIG. 3.

FIG. 5 is an example implementation of the example final weight determination circuitry 310 of FIG. 3. FIG. 5 includes example logic circuits 500, 502, 504, 506, 508.

The final weight determination circuitry 310 of FIG. 5 obtains the aggregate coefficient (Ka), the aggregate DP, the aggregate census, the aggregate DP and census impressions, the aggregate placement to campaign census impressions, the daily DP, the daily census, the daily DP and census impressions, and the percent of daily placement to campaign census impression from the example factor distribution determination circuitry 305. The logic circuit 502 is a divider that normalizes the calculated scores by dividing the aggregate DP by the census discrepancy, to generate an aggregate discrepancy factor. The aggregate DP/census discrepancy factor is a representation of the aggregate database proprietor impression count divided by the aggregate census impression count. The example logic gate 504 is a divider that divides the daily DP by the census discrepancy to generate a daily discrepancy factor. The daily DP/census discrepancy factor is a representation of the daily database proprietor impression count divided by the daily census impression count.

Aggregate DP/Census Discrepancy, Aggregate DP Census Impressions, and Percent of Aggregate Placement to Campaign Census Impressions), also referred to as the aggregate set of factors of the aggregate set of factor scores, reflect the aggregate impression data collected by the AME and/or the database proprietor, and the other three factors (e.g., Daily DP/Census Discrepancy, Daily DP and Census Impressions, and Percent of Daily Placement to Campaign Census Impressions), also referred to as the daily set of factors or the daily set of factor scores, reflect daily impression data collected by the AME and/or the database proprietor.

The example factor distribution determination circuitry 305 and/or the example final weight determination circuitry 310 calculates and/or normalizes the six factors (e.g., the aggregate DP/census discrepancy, the aggregate DP and census impressions, the percent of aggregate placement to campaign census impressions, the daily DP/census discrepancy, the daily DP and census impressions, and the percent of daily placement to campaign census impressions). After the factors for the desired impression data points are normalized, the final weight determination circuitry 310 calculates the final weight score for each of the desired impression data points. The aggregate coefficient (Ka) of the final weight determination circuitry 310 can be any number great than 0 but less than 1. The example logic gate 506 is a multiplier that multiplies the aggregate coefficient with the three aggregate factors (e.g., the Aggregate DP/Aggregate census quotient from the logic gate 502, the aggregate DP and census impressions, and the percent of aggregate placement to campaign census impressions) to reduce the effect of aggregate factors on the generated final weight score. The aggregate factors are also referred to as aggregate factor scores. The aggregate coefficient can be adjusted based on the desired effect of aggregate data on the final weight score calculation. The example logic gate 508 is a multiplier that multiplies the other aggregate factors (e.g., the daily DP/daily census quotient from the logic gate 504, the daily DP and census impressions, and the percent of daily placement to campaign census impressions). The final weight score is equal to the sum of two products. Accordingly, the example logic gate 510 is a summer that sums the product output by the multiplier logic gate 506 and the product output by the multiplier logic gate 508, resulting in the final weight score. An example illustration of this calculation is shown in FIGS. 8A and/or 8B.

While an example manner of implementing the data quality analyzation circuit 190 of FIGS. 1A and/or 1B is illustrated in FIGS. 2, 3 and/or 5 one or more of the elements, processes and/or devices illustrated in FIGS. 2, 3 and/or 5 may be combined, divided, re-arranged, omitted, eliminated and/or implemented in any other way. Further, the example data interface 205, the example score calculation circuitry 210, the example score database 220, the example factor distribution determination circuitry 305, the example final weight determination circuitry 310 the example logic gates 502, 504, 506, 510 and/or, more generally the example data quality analyzation circuitry 190 of FIGS. 2, 3 and/or 5 may be implemented by hardware, software, firmware and/or any combination of hardware, software and/or firmware. Thus, for example, any of the example data interface 205, the example score calculation circuitry 210, the example score database 220, the example factor distribution determination circuitry 305, the example final weight determination circuitry 310 the example logic gates 502, 504, 506, 510 and/or, more generally the example data quality analyzation circuitry 190 of FIGS. 2, 3 and/or 5 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data interface 205, the example score calculation circuitry 210, the example score database 220, the example factor distribution determination circuitry 305 and/or the example final weight determination circuitry 310, the example logic gates 502, 504, 506, 510 and/or, more generally the example data quality analyzation circuitry 190 of FIGS. 2, 3 and/or 5 is/are hereby expressly defined to include a non-transitory computer readable storage device or storage disk such as a memory, a digital versatile disk (DVD), a compact disk (CD), a Blu-ray disk, etc. including the software and/or firmware. Further still, the example data quality analyzation circuitry 190 of FIGS. 2, 3, and/or 5 may include one or more elements, processes and/or devices in addition to, or instead of, those illustrated in FIGS. 2, 3 and/or 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
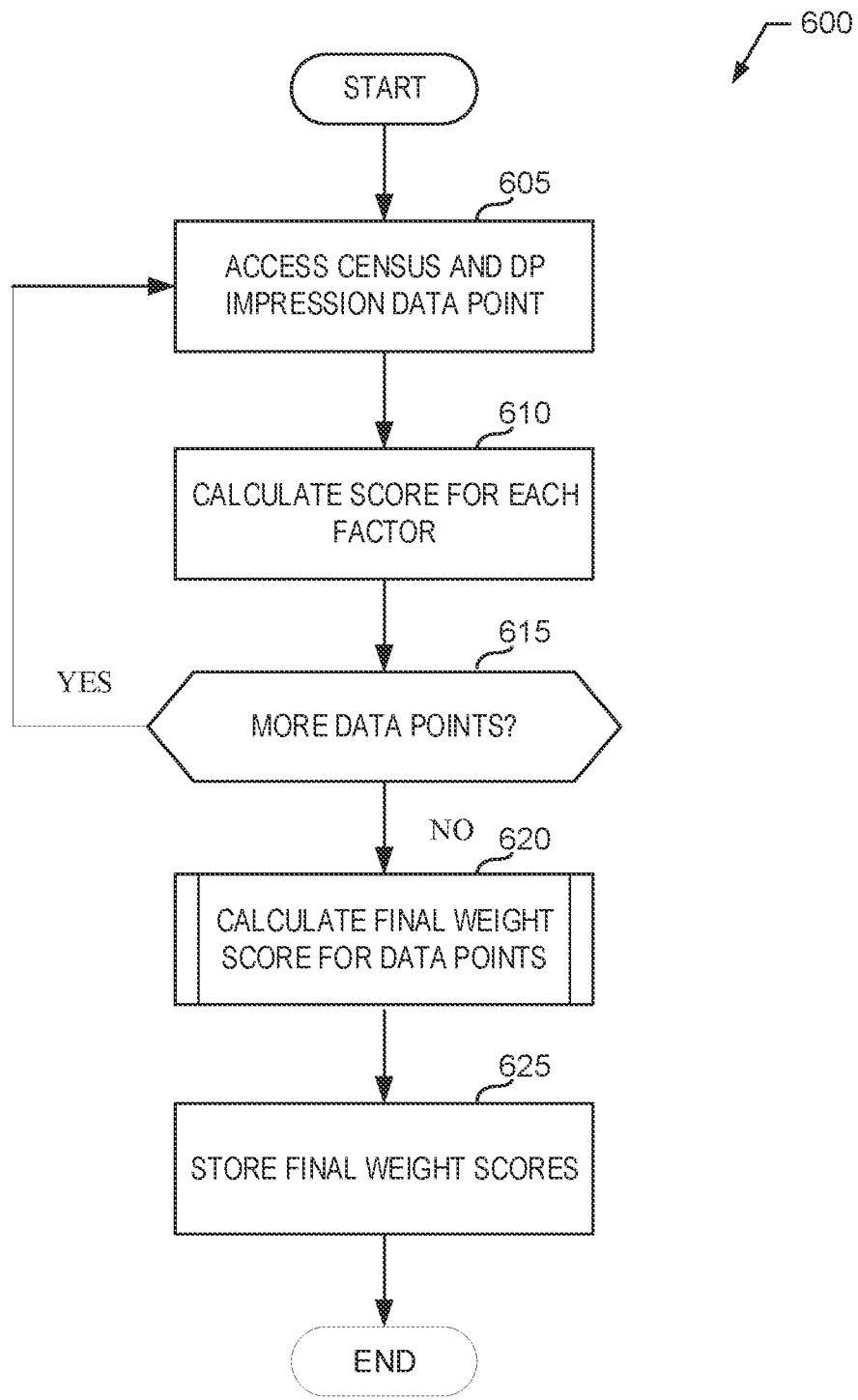
FIGS. 6 and 7 illustrate a flowchart representative of machine readable instructions which may be executed to implement the example data quality analyzation circuit of FIG. 2.
Figure 7:
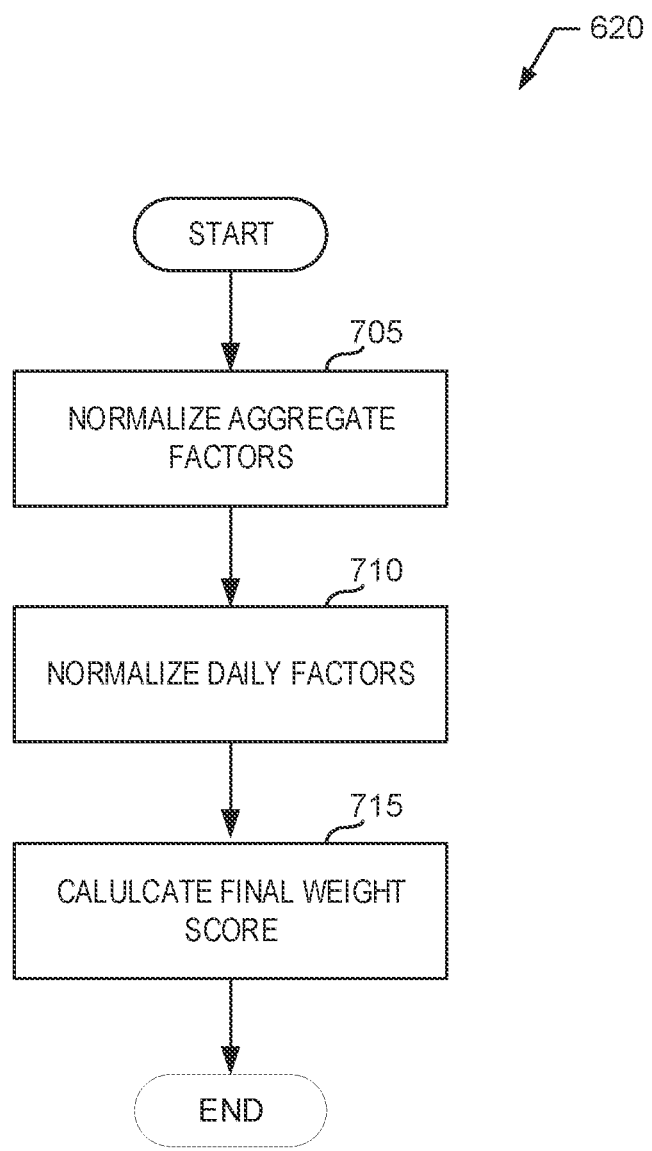

Flowcharts representative of example hardware logic, machine readable instructions, hardware implemented state machines, and/or any combination thereof for implementing the data quality analyzation circuit 190 of FIGS. 2, 3 and/or 5 are shown in FIGS. 6 and 7. The machine readable instructions may be one or more executable programs or portion(s) of an executable program for execution by a computer processor and/or processor circuitry, such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 10 many other methods of implementing the example data quality analyzation circuit 190 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part.

Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6 and 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 6 is a flowchart representative of example computer readable instructions 600 that may be executed to implement the example data quality analyzation circuit 190 of FIGS. 2 3 and/or 5. Although the flowchart of FIG. 6 is described in conjunction with the data quality analyzation circuitry 190 in the AME 102 of FIGS. 1A and/or 1B, the flowchart may be used in conjunction with any data quality analyzation circuitry 190 in any environment.

At block 605, the example data interface 205 accesses a data point within the collected census and database proprietor impression data. For example, the data interface 205 accesses an impression data point within the collected impression data (census impression data and database proprietor impression data) that correspond to impression counts (or the number of impressions) of an advertisement placement. However, any other data points relevant to generating ad ratings may be additionally or alternatively used. As shown in FIG. 8A, the example impression data point includes census impression counts as well as impression counts collected by a database proprietor for an advertisement placement. In this example, the impression data point includes census impression data and impression data collected by a single database proprietor. However, impression data from any number of database proprietors may be additionally or alternatively included.

At block 610, the example score calculation circuitry 210 calculates a score for each factor in the example final weight determination circuitry 310 of FIG. 5 for the impression data point. The score calculation circuitry 210 can calculate the scores for the factors (or factor scores) of the impression data point using the census and DP impression counts, as illustrated in FIG. 8B. For example, the score calculation circuitry 210 calculates the aggregate DP/Census Discrepancy factor by using the logic circuit 502 to divide the aggregate DP impression count by the aggregate census impression count. Additionally, the score calculation circuitry 210 calculates the daily DP/census discrepancy factor using the logic circuit 504 to divide the daily DP by the daily census impressions count.

At block 615, the data interface 205 determines if there are more impression data points whose factor scores need to be calculated. If the data interface 205 determines that there are more impression data points whose factor scores need to be calculated (Block 615: YES), control returns to block 605 and to access another impression data point. If the data interface 205 determines that there are not more impression data points whose factor scores need to be calculated (block 615: NO), the score calculation circuitry 210 calculates the final weight score for each of the impression data points. (block 620), as further described below in conjunction with FIG. 7. The final weight score reflects the quality of the impression data point relative to other impression data points. At block 625, the score calculation circuitry 210 stores the final weight scores in the example score database 220. The final weight scores calculated by the score calculation circuitry 210 can be stored in order of ascending final weight score. The final weight score signifies the quality for the specific campaign, site, placement combination, etc. The higher the score, the worse the data quality. The score calculation circuitry 210 can flag final weight scores that are above a threshold are flagged to be fixed and/or manually examined. Flagging and/or otherwise not using data that corresponds to a high final weight score results in improved data quality and/or identification of bugs in code that correspond to poor data collection.

FIG. 7 is a flowchart representative of example computer readable instructions that may be executed to implement block 620 of FIG. 6 to calculate the final weights score for the data points.

At block 705, the example score calculation circuitry 210 normalizes the aggregate factors of the impression data points to generate a normalized aggregate factor score. The score calculation circuitry 210 normalizes the aggregate factor scores of each impression data point using the factor distribution determination circuitry 305 illustrated in FIG. 4, which compares the scores for each of the aggregate factors of an impression data point against the scores for the respective aggregate factors of other impression data points. As such, the score for each aggregate factor of each impression data point is normalized on a scale from 0 to 1 relative to other impression data points. For example, the aggregate factors are the factors of the final weight equation that use aggregate census and/or DP impression data. At block 710, the score calculation circuitry 210 normalizes the daily factors of the impression data point to generates a normalized daily factor score. Similarly, the score calculation circuitry 210 normalizes the daily factor scores of each impression data point using the factor distribution determination circuitry 305 illustrated in FIG. 4, which compares the scores for each of the daily factors of an impression data point against the scores for the respective daily factors of other impression data points. As such, the score for each daily factor of each impression data point is normalized on a scale from 0 to 1 relative to other impression data points. In this example, the daily factors are the factors of the final weight equation that use daily census and/or DP impression data.

At block 715, the score calculation circuitry 210 calculates the final weight scores for each of the impression data points using the final weight determination circuitry 310 of the score calculation circuitry 210 illustrated in FIG. 5. In the illustrated example of FIG. 5, the calculation of the final weight score for each impression data point introduces an aggregate coefficient Ka, which can be represented by any value greater than 0 but less than 1. By introducing the Ka coefficient as a multiple of the aggregate factors, the calculation of the final weight score for an impression data point has a reduced weight on the aggregate factor scores relative to the daily factor scores.

FIG. 8A is a table illustrating example impression data (e.g., campaign data) points to be analyzed by the data quality analyzation circuit 190 of FIG. 2. In this example, each row of the table represents an impression data point. As previously discussed, each impression data point included a Campaign, Site, and Placement ID, as well as aggregate and daily Census impression counts and aggregate and daily DP impression counts.

FIG. 8B is an example calculation done by the example data quality analyzation circuitry 190 of FIG. 2 using the example impression data point corresponding to the second row from FIG. 8A (e.g., corresponding to the dashed box of FIG. 8A). The left column includes each factor within the final weight determination circuitry 310, the middle column shows a calculation score for each factor (e.g., that may be generated by the example score calculation circuitry 210), and the right column shows a normalized score for each factor. As discussed in connection to FIG. 6, the score calculation circuitry 210 first calculates a score for each factor of the final weight determination circuitry 310. For some factors, such as aggregate DP and census impressions, the calculated score is equal to the number of aggregate census impressions. If no DP information was collected that day for a specific entry, the aggregate of the census and the DP will be equal to the census. That may not always be the case because it is expected that DP values will be collected. If the total is less than 1,000, the normalized value will be 0. Otherwise, the normalized value will be between 0 and 1 depending on the other aggregate values collected that day and the normalization method used.

After the scores for the factors of other impression data points have been calculated, the score calculation circuitry 210 normalizes the aggregate and daily factor scores as discussed in connection with FIG. 7. In this example, the calculated score of 5000 for Aggregate DP and Census Impressions was normalized to 0.75. For example, the calculated score of 5000 for Aggregate DP and Census impression is dependent on the other scores received that day. The normalization is on a logarithmic scare (e.g., the logarithmic distribution 405 of FIG. 4). Thus, if the calculated score were the largest value of the day, the normalized value would be 1. Similarly, the Daily DP and Census Impressions calculated score of 1000 was normalized to 0.8. Using the normalized scores for the aggregate and daily factors, the score calculation circuitry 210 then calculates the final weight score using the final weight determination circuitry 310, as shown below the table. In this example, the aggregate coefficient Ka is equal to 0.8. The final weight score for the impression data point in the second row of FIG. 8A is 0.419 (e.g., Ka*aggregate DP/aggregate census* aggregate dp and census impressions*percent of aggregate placement to campaign census impressions+daily DP*daily census*daily DP and census impressions*percent of daily placement to campaign census impressions). After all of the final weight scores are calculated for the impression data points, they are stored in the score database 220 in order of ascending final weight score.

Figure 9:
FIG. 9 is an illustration of example storage of the final weight scores of the illustrated examples of FIGS. 8A and 8B.

FIG. 9 is an illustrated example of the final weight scores for impression data points stored within the score database 220. The illustrated example of FIG. 9 includes a campaign ID, State ID, and Placement ID for each of the impression data points. Additionally, FIG. 9 includes a column illustrating the existing (or old) binary system that was previously implemented by other data quality analyzation circuitries. The existing binary system gave little insight as to how an impression data point looked relative to other data points. FIG. 9 also includes a final weight score column. In this example, the impression data points are ordered in ascending final weight score order. As such, impression data points with higher final weight scores can be seen at the top of the example score database 220 and extracted for further evaluation. In some examples, the score database 220 may store the impression data points in descending final weight score order.

Figure 10:
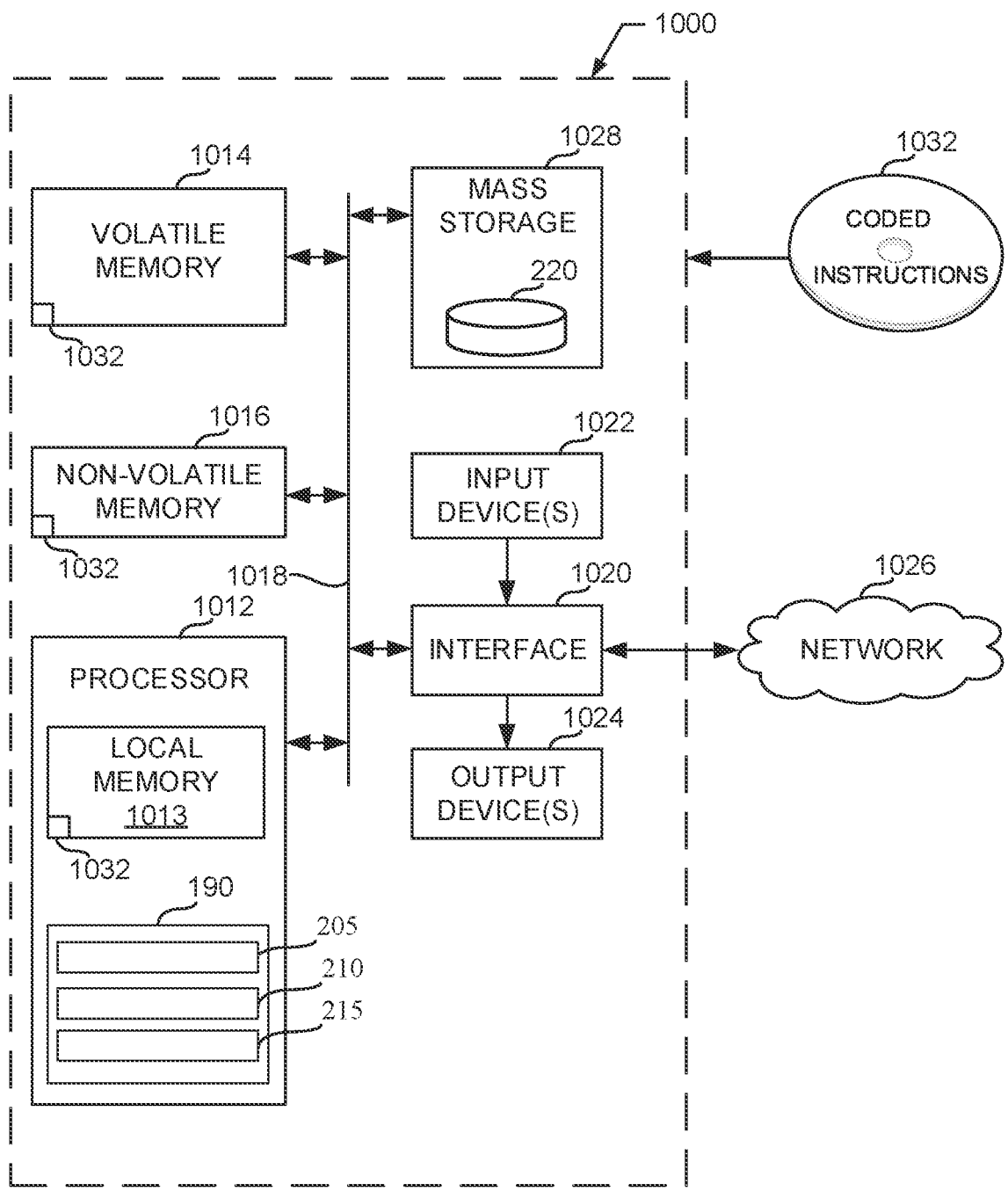
FIG. 10 is a block diagram of an example processing platform structured to execute the instructions of FIGS. 6 and 7 to implement the example data quality analyzation circuit of FIG. 2.

FIG. 10 is a block diagram of an example processor platform 1000 structured to execute the instructions of FIGS. 6 and 7 to implement the analyzation circuitry 190 of FIG. 2. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data interface 205 and the example score calculation circuitry 210, and the logic circuitry 502, 504, 506, 508, 510.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller. In this example, the score database 220 may be implemented by any one of the local memory 1013, the volatile memory 1014, the non-volatile memory 1016, and/or the mass storage 1028.

The processor platform 1000 of the illustrated example also includes an interface circuit 1020. In some examples, the interface circuit 1020 may implement the example data interface 205. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 6 and 7 may be stored in the mass storage device 1028, in the volatile memory 1014, in the non-volatile memory 1016, and/or on a removable non-transitory computer readable storage medium such as a CD or DVD.

Figure 11:
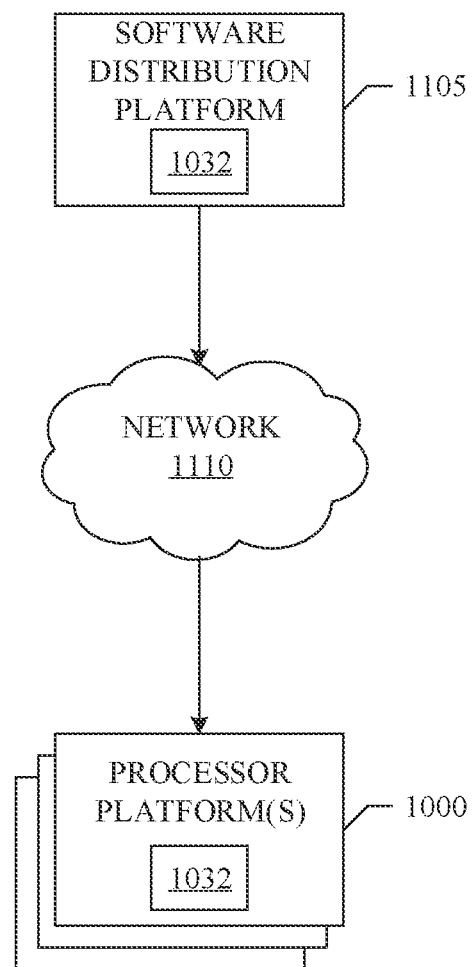
FIG. 11 is a block diagram of an example software distribution platform to distribute software (e.g., software corresponding to the example computer readable instructions of FIGS. 6 and 7) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1105 to distribute software such as the example computer readable instructions 1032 of FIG. 10 to third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1032 of FIG. 10. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the computer readable instructions 1032, which may correspond to the example computer readable instructions 600 of FIGS. 6 and 7 as described above. The one or more servers of the example software distribution platform 1105 are in communication with a network 1110, which may correspond to any one or more of the Internet and/or the example network 1026 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1032 from the software distribution platform 1105. For example, the software, which may correspond to the example computer readable instructions 500 of FIG. 5, may be downloaded to the example processor platform 1000, which is to execute the computer readable instructions 1032 to implement the data quality analyzation circuit 190. In some example, one or more servers of the software distribution platform 1105 periodically offer, transmit, and/or force updates to the software (e.g., the example computer readable instructions 1032 of FIG. 10) to ensure improvements, patches, updates, etc. are distributed and applied to the software at the end user devices.

From the foregoing, it will be appreciated that example methods, apparatus and articles of manufacture have been disclosed that enable AME's to understand the merit of an impression data point relative to other impression data points. By providing a better understanding of impression data points, AME's are able to improve the accuracy and effectiveness of digital ad ratings for media campaigns and efficiently allocate resources to their most affected data points. Additionally, machine-learning applications of the example methods, apparatus, and articles of manufacture disclosed herein would be able to predict affected data points for preventative triage.

Example methods, apparatus, systems, and articles of manufacture to identify and triage digital ad ratings data quality issues are disclosed herein. Further examples and combinations thereof include the following: Example 1 includes an apparatus comprising memory, instructions included in the apparatus, and processor circuitry to execute the instruction to generate an aggregate factor score based on the aggregate data from a first impression data point, the first impression data point including aggregate data and daily data, generate a daily factor score based on the daily data from the first impression data point, normalize the aggregate factor score based on aggregate factor scores of at least a second impression data point, normalize the daily factor score based on daily factor scores of at least the second impression data point, calculate a final weight score for the first impression data point using the normalized aggregate factor score and the normalized daily factor score for the first impression data point, and flag the final weight score if it does not satisfy a threshold score.

Example 2 includes the apparatus of example 1, wherein the processor circuitry is to reduce a weight of the aggregate factor scores using an aggregate coefficient.

Example 3 includes the apparatus of example 1, wherein the first impression data point includes first aggregate impression data and first daily impression data from a first source, second aggregate impression data and second daily impression data from a second source different than the first source, and campaign data.

Example 4 includes the apparatus of example 3, wherein the processor circuitry is to generate the aggregate factor score using the first and second aggregate impression data and the campaign data, and generate the daily factor score using the first and second daily impression data and the campaign data.

Example 5 includes the apparatus of example 4, wherein the aggregate factor scores include at least one of an aggregate discrepancy factor score between the first aggregate impression data and the second aggregate impression data, an aggregate impression factor score based on the first aggregate impression data and the second aggregate impression data, or an aggregate percentage value based on the first aggregate impression data and the campaign data.

Example 6 includes the apparatus of example 4, wherein the daily factor scores include at least one of a daily discrepancy factor between the first daily impression data and the second daily impression data, a daily impression factor based on the first daily impression data and the second daily impression data, or a daily percentage value based on the first daily impression data and the campaign data.

Example 7 includes the apparatus of example 1, wherein the aggregate factor score and the daily factor score of the first impression data point are normalized on a scale from zero to one.

Example 8 includes the apparatus of example 1, wherein the processor circuitry is to store the final weight score of the first impression data point in a score database in order of ascending final weight score.

Example 9 includes an apparatus comprising an interface to access a first impression data point, the first impression data point including aggregate data and daily data, and score calculation circuitry to generate an aggregate factor score based on the aggregate data from the first impression data point, generate a daily factor score based on the daily data from the first impression data point, normalize the aggregate factor score based on aggregate factor scores of at least a second impression data point, normalize the daily factor score based on daily factor scores of at least the second impression data point, calculate a final weight score for the first impression data point using the normalized aggregate factor score and the normalized daily factor score for the first impression data point, and flag the final weight score if it does not satisfy a threshold score.

Example 10 includes the apparatus of example 9, wherein the score calculation circuitry is to reduce a weight of the aggregate factor scores using an aggregate coefficient.

Example 11 includes the apparatus of example 9, wherein the first impression data point includes first aggregate impression data and first daily impression data from a first source, second aggregate impression data and second daily impression data from a second source different than the first source, and campaign data.

Example 12 includes the apparatus of example 11, wherein the score calculation circuitry is to generate the aggregate factor score using the first and second aggregate impression data and the campaign data, and generate the daily factor score using the first and second daily impression data and the campaign data.

Example 13 includes the apparatus of example 12, wherein the aggregate factor scores include at least one of an aggregate discrepancy factor score between the first aggregate impression data and the second aggregate impression data, an aggregate impression factor score based on the first aggregate impression data and the second aggregate impression data, or an aggregate percentage value based on the first aggregate impression data and the campaign data.

Example 14 includes the apparatus of example 12, wherein the daily factor scores include at least one of a daily discrepancy factor between the first daily impression data and the second daily impression data, a daily impression factor based on the first daily impression data and the second daily impression data, or a daily percentage value based on the first daily impression data and the campaign data.

Example 15 includes the apparatus of example 9, wherein the aggregate factor score and the daily factor score of the first impression data point are normalized on a scale from zero to one.

Example 15 includes the apparatus of example 9, wherein the score calculation circuitry is to store the final weight score of the first impression data point in a score database in order of ascending final weight score.

Example 16 includes a non-transitory computer readable storage medium comprising instructions which, when executed, cause one or more processors to at least generate an aggregate factor score based on aggregate data from a first impression data point, the first impression data point including aggregate data and daily data, generate a daily factor score based on the daily data from the first impression data point, normalize the aggregate factor score based on aggregate factor scores of at least a second impression data point, normalize the daily factor score based on daily factor scores of at least the second impression data point, calculate a final weight score for the first impression data point using the normalized aggregate factor score and the normalized daily factor score for the first impression data point, and flag the final weight score if it does not satisfy a threshold score.

Example 17 includes the apparatus of example 16, wherein the instructions cause the one or more processors to at least reduce a weight of the aggregate factor scores using an aggregate coefficient.

Example 18 includes the apparatus of example 16, wherein the first impression data point includes first aggregate impression data and first daily impression data from a first source, second aggregate impression data and second daily impression data from a second source different than the first source, and campaign data.

Example 19 includes the apparatus of example 18, wherein the instructions cause the one or more processors to at least generate the aggregate factor score using the first and second aggregate impression data and the campaign data, and generate the daily factor score using the first and second daily impression data and the campaign data.

Example 20 includes the apparatus of example 19, wherein the aggregate factor scores include at least one of an aggregate discrepancy factor score between the first aggregate impression data and the second aggregate impression data, an aggregate impression factor score based on the first aggregate impression data and the second aggregate impression data, or an aggregate percentage value based on the first aggregate impression data and the campaign data.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An audience measurement computing system comprising:
a processor; and
a memory storing instructions that, when executed by the processor, cause the audience measurement computing system to perform operations comprising:
receiving, via first network communications with computing devices, first beacon requests indicative of media accessed at the computing devices;
logging a first impression data point for the media by storing media identifiers included in the first beacon requests, the media identifiers identifying the media accessed at the computing devices;
based on one or more of device identifiers or user identifiers included in at least a subset of the first beacon requests, selecting a database proprietor to which to transmit beacon responses;
transmitting, via second network communications with the computing devices, the beacon responses identifying the database proprietor, wherein the beacon responses are configured to trigger the computing devices to transmit second beacon requests to the database proprietor;
based on database proprietor impression data received from the database proprietor via third network communications, logging a second impression data point for the media;
generating an aggregate factor score based on aggregate data from the first impression data point, the first impression data point including the aggregate data and duration data corresponding to a duration of time;
determining a duration factor score based on the duration data from the first impression data point;
determining a final weight score for the second impression data point using a normalized aggregate factor score and a normalized duration factor score for the second impression data point, wherein the normalized aggregate factor score is based on aggregate factor scores of the first impression data point, and the normalized duration factor score is based on duration factor scores of the first impression data point;
storing the final weight score in the memory, and
based on the determination that the final weight score does not satisfy a threshold score, flagging the first impression data point as having poor quality relative to the second impression data point.

2. The audience measurement computing system of claim 1, wherein the operations further comprise,
reducing a weight of the aggregate factor scores using an aggregate coefficient.

3. The audience measurement computing system of claim 1, wherein the first impression data point includes first aggregate impression data and first duration impression data from a first source, second aggregate impression data and second duration impression data from a second source different than the first source, and campaign data.

4. The audience measurement computing system of claim 3, wherein the operations further comprise:
generating the aggregate factor score using the first and second aggregate impression data and the campaign data; and
generating the duration factor score using the first and second duration impression data and the campaign data.

5. The audience measurement computing system of claim 4, wherein the aggregate factor scores include at least one of:
an aggregate discrepancy factor score between the first aggregate impression data and the second aggregate impression data;
an aggregate impression factor score based on the first aggregate impression data and the second aggregate impression data; or
an aggregate percentage value based on the first aggregate impression data and the campaign data.

6. The audience measurement computing system of claim 4, wherein the duration factor scores include at least one of:
a discrepancy factor between the first duration impression data and the second duration impression data;
an impression factor based on the first duration impression data and the second duration impression data; or
a percentage value based on the first duration impression data and the campaign data.

7. The audience measurement computing system of claim 1, wherein the aggregate factor score and the duration factor score of the first impression data point are normalized on a scale from zero to one.

8. The audience measurement computing system of claim 1, wherein the duration of time is a day.

9. The audience measurement computing system of claim 1, wherein the operations further comprise:
generating at least one of the aggregate data and the duration data based on at least one of a logarithmic distribution, a sigmoid distribution, or a binary distribution.

10. A method comprising:
receiving, via first network communications with computing devices, first beacon requests indicative of media accessed at the computing devices;
logging a first impression data point for the media by storing media identifiers included in the first beacon requests, the media identifiers identifying the media accessed at the computing devices;

based on one or more of device identifiers or user identifiers included in at least a subset of the first beacon requests, selecting a database proprietor to which to transmit beacon responses;

transmitting, via second network communications with the computing devices, the beacon responses identifying the database proprietor, wherein the beacon responses are configured to trigger the computing devices to transmit second beacon requests to the database proprietor;

based on database proprietor impression data received from the database proprietor via third network communications, logging a second impression data point for the media;

generating an aggregate factor score based on aggregate data from the first impression data point;

generating a duration factor score based on duration data from the first impression data point;

determining a final weight score for the second impression data point using a normalized aggregate factor score and a normalized duration factor score for the second impression data point, wherein the normalized aggregate factor score is based on aggregate factor scores of the first impression data point, the normalized duration factor score is based on duration factor scores of the first impression data point;

storing the final weight score in the memory; and based on the determination that the final weight score does not satisfy a threshold score, flagging the first impression data point as having low quality relative to the second impression data point.

11. The method of claim 10, further comprising reducing a weight of the aggregate factor scores using an aggregate coefficient.

12. The method of claim 10, wherein the first impression data point includes first aggregate impression data and first duration impression data from a first source, second aggregate impression data and second duration impression data from a second source different than the first source, and campaign data.

13. The method of claim 12, further comprising:
generating the aggregate factor score using the first and second aggregate impression data and the campaign data; and
generating the duration factor score using the first and second duration impression data and the campaign data.

14. The method of claim 13, wherein the aggregate factor scores include at least one of:
an aggregate discrepancy factor score between the first aggregate impression data and the second aggregate impression data;
an aggregate impression factor score based on the first aggregate impression data and the second aggregate impression data; or
an aggregate percentage value based on first aggregate impression data and the campaign data.

15. The method of claim 13, wherein the duration factor scores include at least one of:
a discrepancy factor between the first duration impression data and the second duration impression data;
an impression factor based on the first duration impression data and the second duration impression data; or
a percentage value based on the first duration impression data and the campaign data.

16. A non-transitory computer readable storage medium having stored thereon program instructions that, upon execution by a processor, cause performance of a set of operations comprising:
receiving, via first network communications with computing devices, first beacon requests indicative of media accessed at the computing devices;
logging a first impression data point for the media by storing media identifiers included in the first beacon requests, the media identifiers identifying the media accessed at the computing devices;
based on one or more of device identifiers or user identifiers included in at least a subset of the first beacon requests, selecting a database proprietor to which to transmit beacon responses;
transmitting, via second network communications with the computing devices, the beacon responses identifying the database proprietor, wherein the beacon responses are configured to trigger the computing devices to transmit second beacon requests to the database proprietor;
based on database proprietor impression data received from the database proprietor via third network communications, logging a second impression data point for the media;
generating an aggregate factor score based on aggregate data from the first impression data point, the first impression data point including the aggregate data and duration data;
generating a duration factor score based on the duration data from the first impression data point;
determining a final weight score for the second impression data point using a normalized aggregate factor score and a normalized duration factor score for the second impression data point, wherein the normalized aggregate factor score is based on aggregate factor scores of the first impression data point, and the normalized duration factor score is based on duration factor scores of the first impression data point;
storing the final weight score in a memory; and
based on the determination that the final weight score does not satisfy a threshold score, not using data corresponding to the final weight score.

17. The non-transitory computer readable storage medium of claim 16, wherein the set of operations further comprises:
reducing a weight of the aggregate factor scores using an aggregate coefficient.

18. The non-transitory computer readable storage medium of claim 16, wherein the first impression data point includes first aggregate impression data and first duration impression data from a first source, second aggregate impression data and second duration impression data from a second source different than the first source, and campaign data.

19. The non-transitory computer readable storage medium of claim 18, the set of operations further comprising:
generating the aggregate factor score using the first and second aggregate impression data and the campaign data; and
generating the duration factor score using the first and second duration impression data and the campaign data.

20. The non-transitory computer readable storage medium of claim 19, wherein the aggregate factor scores include at least one of:
an aggregate discrepancy factor score between the first aggregate impression data and the second aggregate impression data;

an aggregate impression factor score based on the first aggregate impression data and the second aggregate impression data; or an aggregate percentage value based on the first aggregate impression data and the campaign data.

\* \* \* \* \*